(12) United States Patent
Kang et al.

(10) Patent No.: US 10,348,970 B2
(45) Date of Patent: Jul. 9, 2019

(54) MOBILE TERMINAL AND METHOD OF OPERATING THE SAME

(71) Applicant: LG ELECTRONICS INC., Seoul (KR)

(72) Inventors: Shinnyue Kang, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 15/422,413

(22) Filed: Feb. 1, 2017

(65) Prior Publication Data
US 2018/0048823 A1 Feb. 15, 2018

(30) Foreign Application Priority Data

Aug. 12, 2016 (KR) .................. 10-2016-0102863

(51) Int. Cl.
- G06F 3/16 (2006.01)
- G06T 11/60 (2006.01)
- H04N 5/232 (2006.01)

(52) U.S. Cl.
CPC ......... *H04N 5/23293* (2013.01); *G06F 3/167* (2013.01); *G06T 11/60* (2013.01); *H04N 5/23238* (2013.01); *G06T 2210/22* (2013.01)

(58) Field of Classification Search
CPC ............ H04N 5/23293; H04N 5/23238; G06T 2210/22; G06T 11/60; G06F 3/167
USPC .................................................... 348/333.05
See application file for complete search history.

(56) References Cited

U.S. PATENT DOCUMENTS

| | | | |
|---|---|---|---|
| 8,190,604 B2 | 5/2012 | Wen et al. | |
| 8,217,988 B2 | 7/2012 | Park | |
| 8,228,364 B2 | 7/2012 | Cilia | |
| 9,262,800 B2 | 2/2016 | Cilia | |
| 9,363,463 B2 * | 6/2016 | Taneichi | H04N 5/765 |
| 9,824,723 B1 * | 11/2017 | Bentley | G11B 27/3081 |
| 9,934,823 B1 * | 4/2018 | Bentley | G11B 27/3081 |
| 10,027,888 B1 * | 7/2018 | Mackraz | H04N 5/23238 |
| 10,140,514 B1 * | 11/2018 | Rao | G06K 9/00677 |
| 10,157,638 B2 * | 12/2018 | Ramaswamy | G11B 27/034 |
| 2006/0034367 A1 | 2/2006 | Park | |
| 2012/0062691 A1 * | 3/2012 | Fowler | F16M 11/10 |
| | | | 348/36 |
| 2012/0063670 A1 * | 3/2012 | Woo | G06T 11/60 |
| | | | 382/154 |
| 2012/0236112 A1 | 9/2012 | Cilia | |

(Continued)

FOREIGN PATENT DOCUMENTS

WO 2009146113 12/2009

OTHER PUBLICATIONS

PCT International Application No. PCT/KR2017/005838, International Search Report dated Sep. 11, 2017, 3 pages.

*Primary Examiner* — Pritham D Prabhakher
(74) *Attorney, Agent, or Firm* — Lee, Hong, Degerman, Kang & Waimey

(57) ABSTRACT

A mobile terminal includes a display unit; and a controller configured to obtain use intention information indicating an intention to use omnidirectional content, extract a partial image included in the omnidirectional content, and display the extracted partial image through the display unit, wherein the extracted partial image is changed according to the use intention information.

20 Claims, 25 Drawing Sheets

(56) References Cited

U.S. PATENT DOCUMENTS

| | | | |
|---|---|---|---|
| 2013/0191372 A1* | 7/2013 | Lee | G06Q 10/10 |
| | | | 707/722 |
| 2013/0191416 A1* | 7/2013 | Lee | G06F 16/24534 |
| | | | 707/771 |
| 2014/0063181 A1* | 3/2014 | Lee | G06T 3/0025 |
| | | | 348/36 |
| 2014/0184821 A1 | 7/2014 | Taneichi et al. | |
| 2015/0310897 A1* | 10/2015 | Ko | G11B 27/034 |
| | | | 386/230 |
| 2016/0048988 A1 | 2/2016 | Lee et al. | |
| 2016/0080650 A1* | 3/2016 | Okazawa | H04N 21/4312 |
| | | | 348/36 |
| 2016/0360160 A1* | 12/2016 | Eizenberg | G06Q 30/0207 |
| 2017/0187852 A1* | 6/2017 | Baek | H04M 1/0264 |
| 2017/0213389 A1* | 7/2017 | Han | H04N 5/44591 |
| 2017/0255841 A1* | 9/2017 | Yoo | G06F 3/0488 |
| 2017/0316256 A1* | 11/2017 | Kim | G06K 9/00765 |
| 2017/0372749 A1* | 12/2017 | Ramaswamy | G11B 27/034 |
| 2018/0039854 A1* | 2/2018 | Wren | G06F 3/04842 |
| 2018/0190323 A1* | 7/2018 | de Jong | G11B 27/034 |
| 2018/0203659 A1* | 7/2018 | Ogawara | G06F 3/1446 |

* cited by examiner

FIG. 11
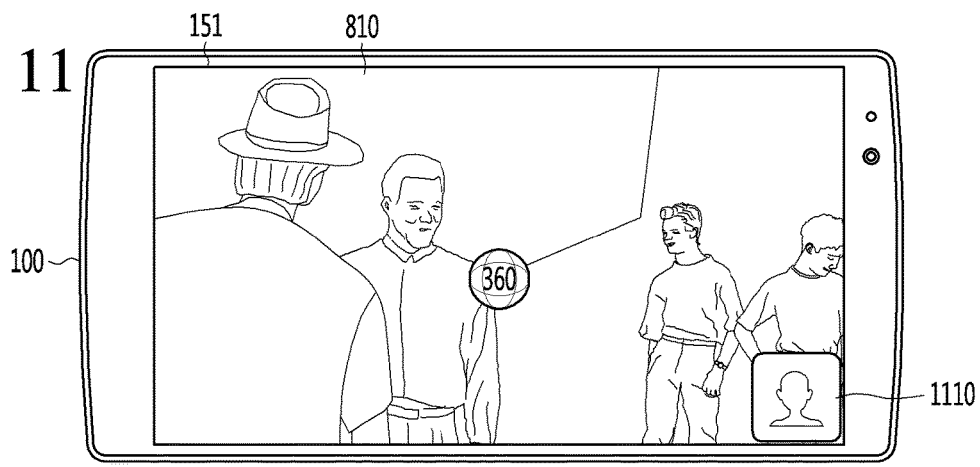
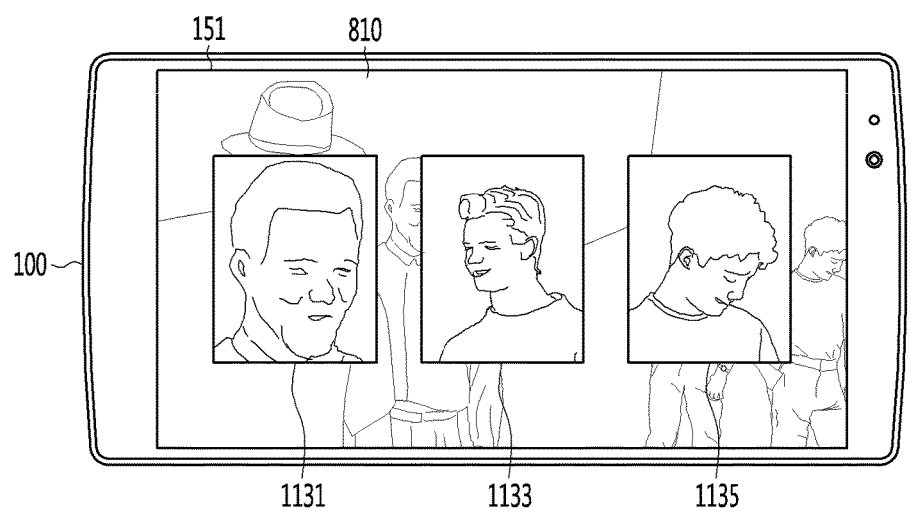
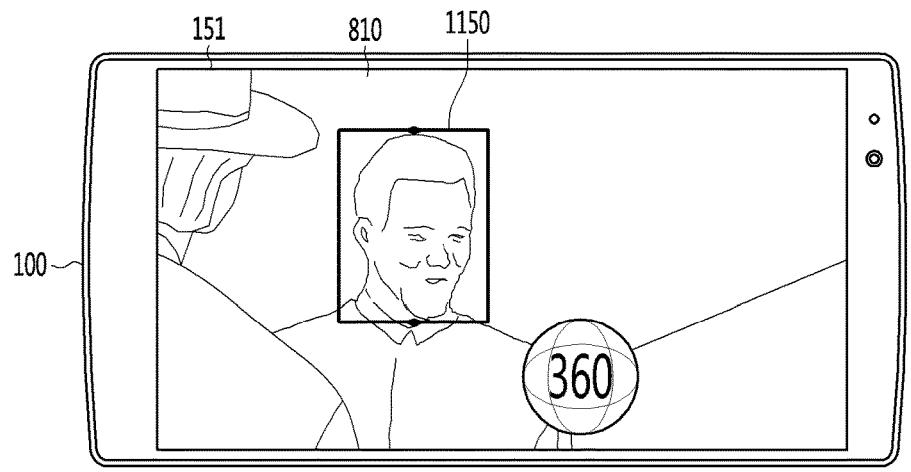

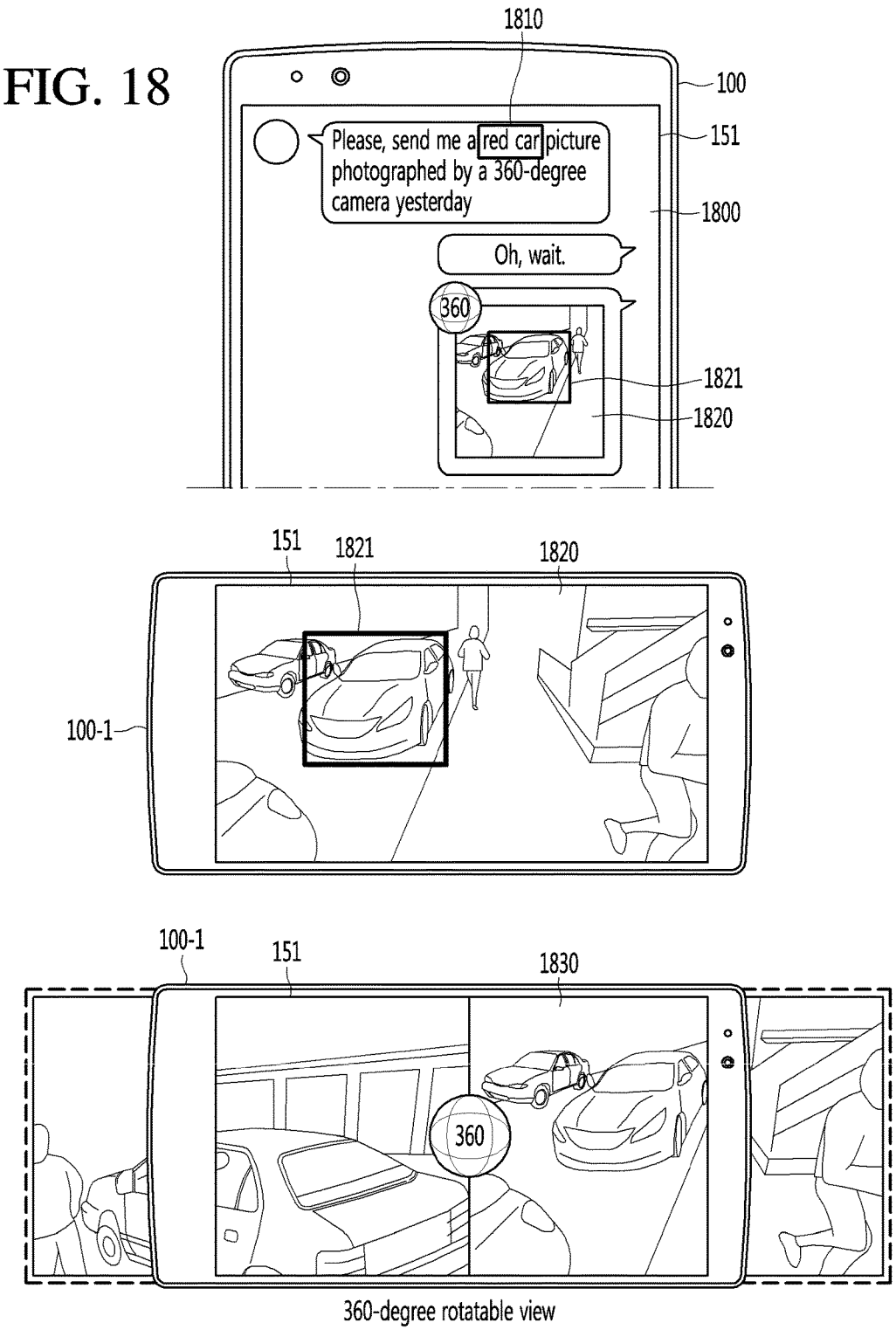

FIG. 23A
FIG. 23B
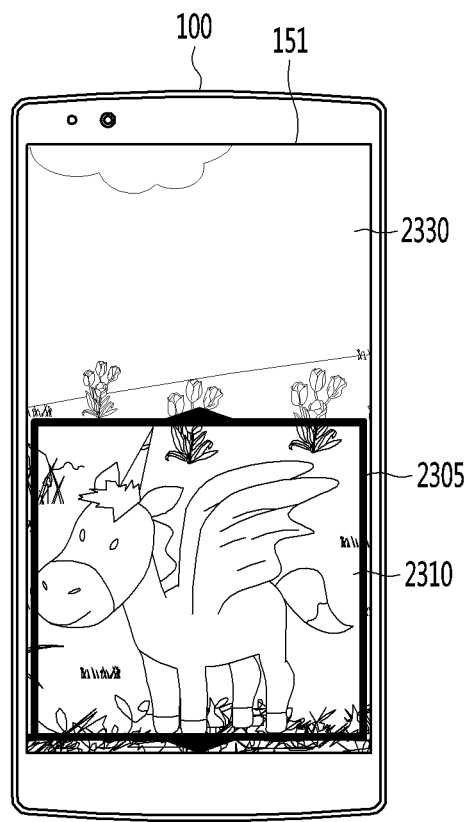
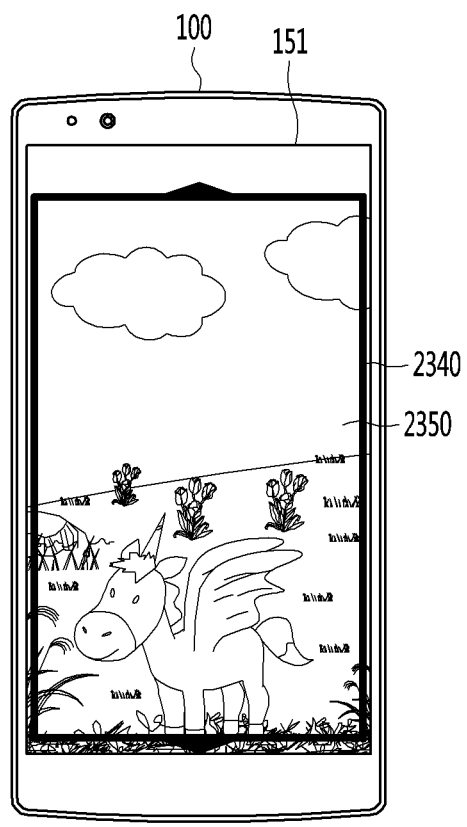

MOBILE TERMINAL AND METHOD OF OPERATING THE SAME

CROSS-REFERENCE TO RELATED APPLICATIONS

This application claims the benefit of earlier filing date and right of priority to Korean Patent Application No. 10-2016-0102863 filed on Aug. 12, 2016, the contents of which are all hereby incorporated by reference herein in their entirety.

TECHNICAL FIELD

The present disclosure relates to a mobile terminal, and more specifically, to a mobile terminal which provides one omnidirectional content differently depending on a situation and a purpose.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, mobile terminals may be used to interwork with a photographing device that photographs an omnidirectional image. A general camera photographs a two-dimensional image, and a 360-degree camera may photograph a sphere-shaped omnidirectional image. The photographed omnidirectional image may be transmitted to the mobile terminal and be displayed on a display.

However, the display of the mobile terminal cannot help displaying only a partial image of the omnidirectional image. Therefore, there is a problem that a user needs to touch the display several times in order to view other images than the displayed partial image.

SUMMARY

Accordingly, an object of the present disclosure is to address the above-noted and other problems.

The present disclosure relates to a mobile terminal and a method of operating the same, which provide edited omnidirectional content by reflecting a user intention to use the omnidirectional content.

The present disclosure relates to a mobile terminal and a method of operating the same, which rapidly provide a portion of omnidirectional content by reflecting a user intention.

The present disclosure relates to a mobile terminal and a method of operating the same, which allow an image to be extracted or cropped from omnidirectional content to be changed depending on a situation and a purpose with respect to single omnidirectional content.

A mobile terminal according to one embodiment of the present disclosure includes a display unit; and a controller configured to obtain use intention information indicating an intention to use omnidirectional content, extract a partial image included in the omnidirectional content, and display the extracted partial image through the display unit, wherein the extracted partial image is changed according to the use intention information.

The controller may extract a plurality of faces included in the omnidirectional content and display a plurality of face thumbnails corresponding to the extracted plurality of faces if the use intention information is obtained through a profile picture setting request.

If any one of the plurality of face thumbnails is selected, the controller may display a partial image corresponding to the selected face thumbnail, and the partial image may be an image included in the omnidirectional content.

The controller further may display a crop box for editing a face region corresponding to the face thumbnail.

The controller may extract a partial image, which the user has viewed most frequently, from the omnidirectional content if the use intention information is obtained through a background screen picture setting request for setting a background screen picture of the mobile terminal.

The controller may display a center of the extracted partial image on an empty region included in a background screen of the mobile terminal.

The controller may acquire a partial image, which the user has viewed most frequently, from the omnidirectional content and locate a center of the extracted partial image on an empty region of the lock screen if the use intention information is obtained through a request for setting a picture for a lock screen of the mobile terminal.

The controller may obtain identification information for identifying a partial image displayed on the display unit and transmit the omnidirectional content, in which the obtained identification information is included, to a terminal of a counterpart if the use intention information is obtained through a request for sharing the omnidirectional content.

The identification information may include one or more of an image obtained by capturing the partial image and angle information indicating a position at which the partial image is located in the omnidirectional content The mobile terminal may further include a microphone configured to receive a phonetic word, and the controller may obtain the phonetic word input through the microphone as the use intention information and extract a partial image including an object corresponding to the phonetic word from the omnidirectional content when the omnidirectional content is photographed.

According to various embodiments of the present disclosure, the user can rapidly view a portion of the omnidirectional content, which is intended by the user herself or himself without separate searching.

Further scope of applicability of the present disclosure will become apparent from the detailed description given hereinafter. However, it should be understood that the detailed description and specific examples, while indicating preferred embodiments, are given by illustration only, since various changes and modifications within the spirit and scope of the present disclosure will become apparent to those skilled in the art from this detailed description.

BRIEF DESCRIPTION OF THE DRAWINGS

FIGS. 10 to 12 are diagrams for describing an example of providing edited omnidirectional content if the use intention information is obtained through the request for setting the omnidirectional content as a profile picture according to an embodiment of the present disclosure.

FIG. 18 is a diagram for describing an example of providing edited omnidirectional content if use intention information is obtained through text according to an embodiment of the present disclosure.

FIGS. 23A and 23B are diagrams for describing an example of providing edited omnidirectional content based on user intention according to another embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
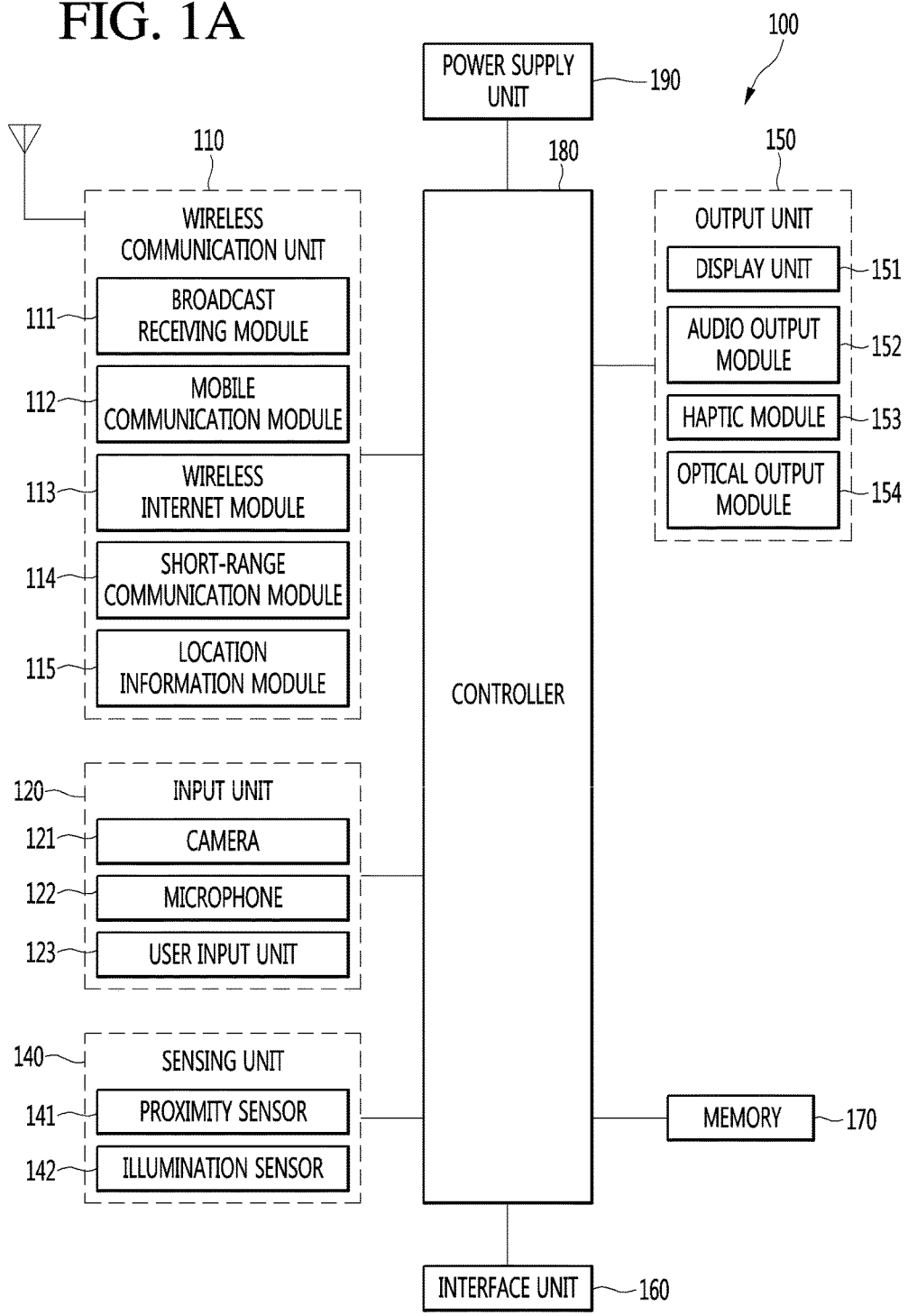
FIG. 1A is a block diagram of a mobile terminal in accordance with the present disclosure.
Figure 1B:
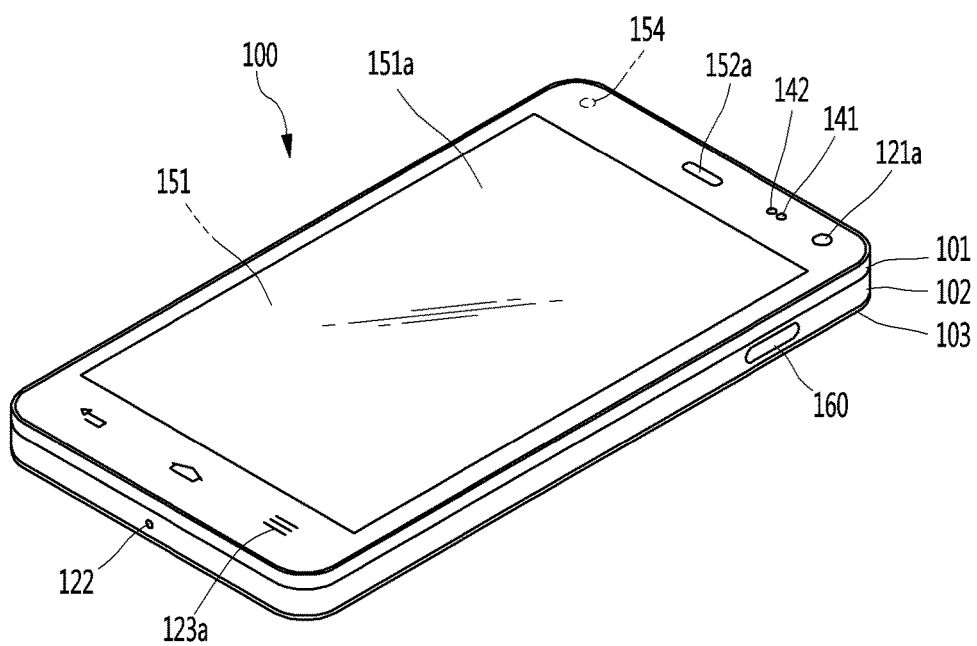
FIGS. 1B and 1C are conceptual views of one example of the mobile terminal, viewed from different directions.
Figure 1C:
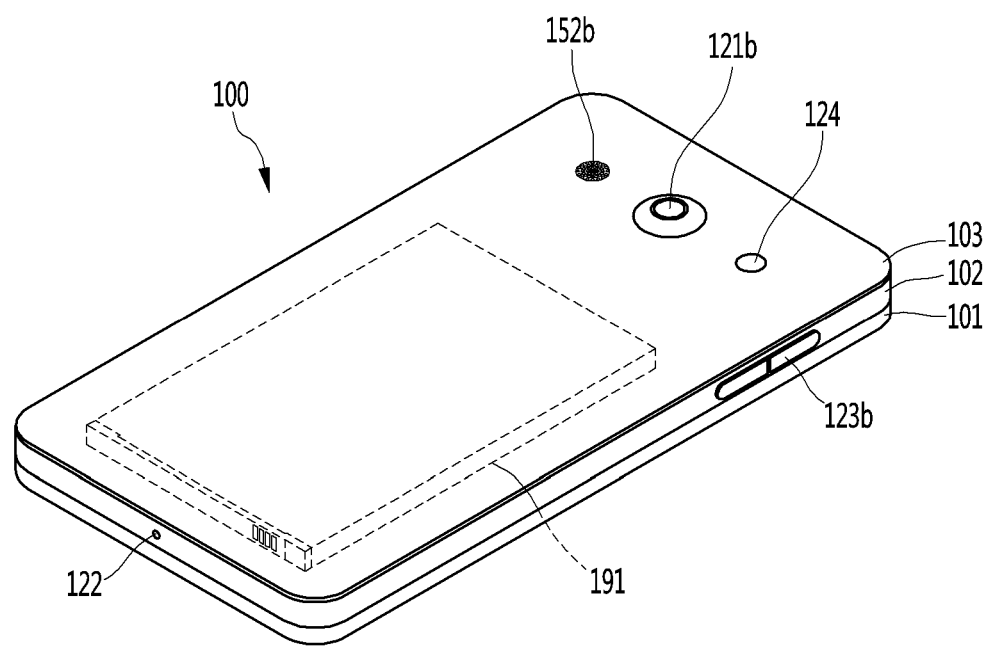

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel.

The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, if the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, if the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, if the mobile terminal uses a GPS module, a position of the mobile terminal may be acquired using a signal sent from a GPS satellite. As another example, if the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

If a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

If the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications if a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, if the rear cover 103 is detached from the rear case 102, the electronic components mounted to the rear case 102 are externally exposed.

As illustrated, if the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The mobile terminal includes a display unit 151, a first and a second audio output modules 152a/152b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. If a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. If a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger if the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." If the second camera 121b is implemented as an array camera, images may be captured in various manners using the plurality of lenses and images with better qualities.

As shown in FIG. 1C, a flash 124 is shown adjacent to the second camera 121b. If an image of a subject is captured with the second camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. If the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
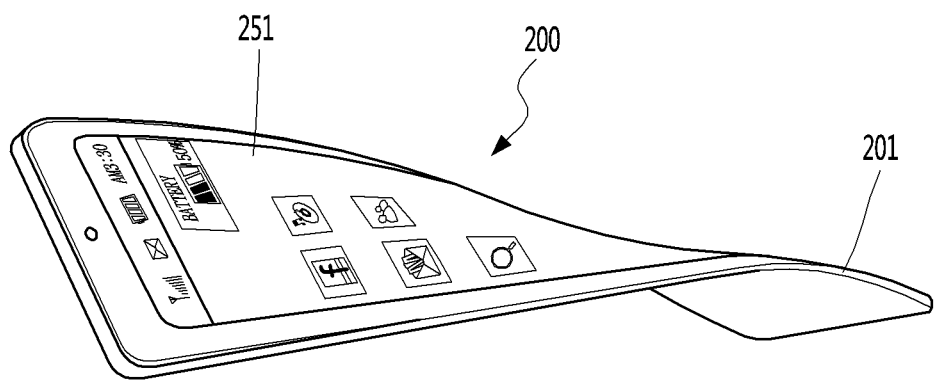
FIG. 2 is a conceptual view of a deformable mobile terminal according to an alternative embodiment of the present disclosure.

FIG. 2 is a conceptual view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 251, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

Figure 3:
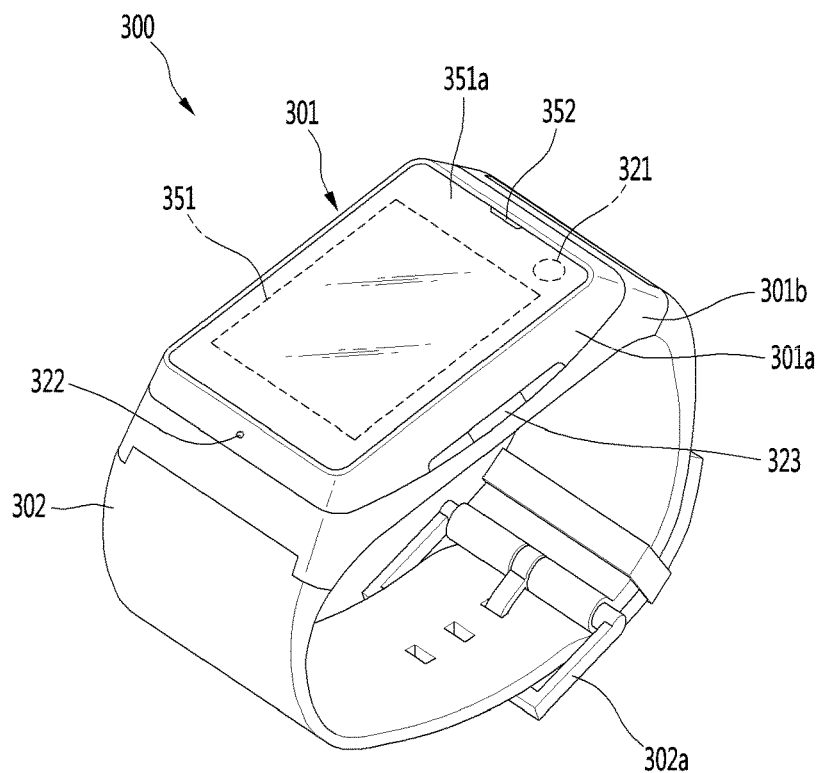
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
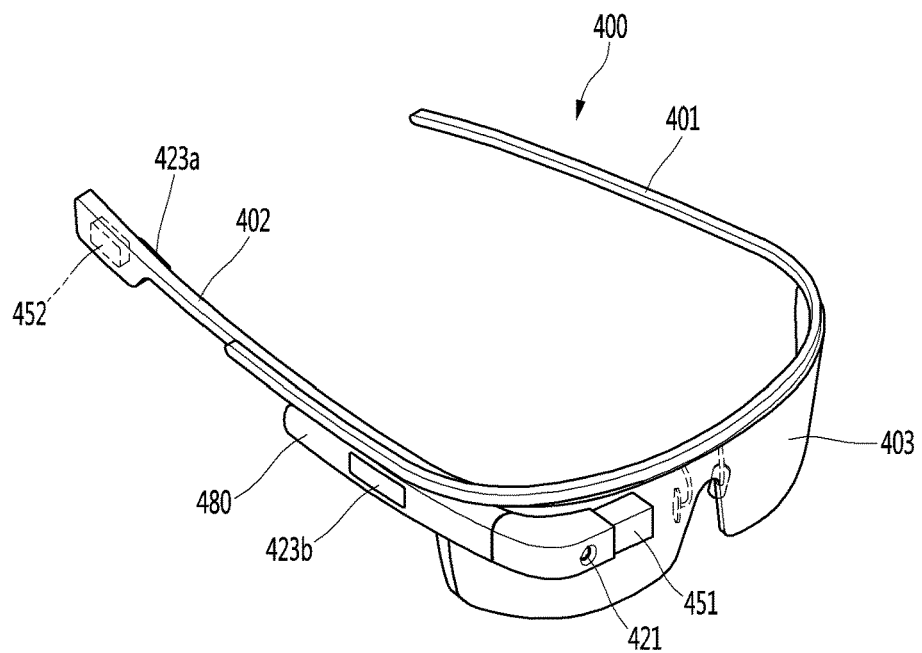
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances.

A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly obtained. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can obtain location information by being connected to at least one wireless AP. The number of wireless APs required to obtain location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
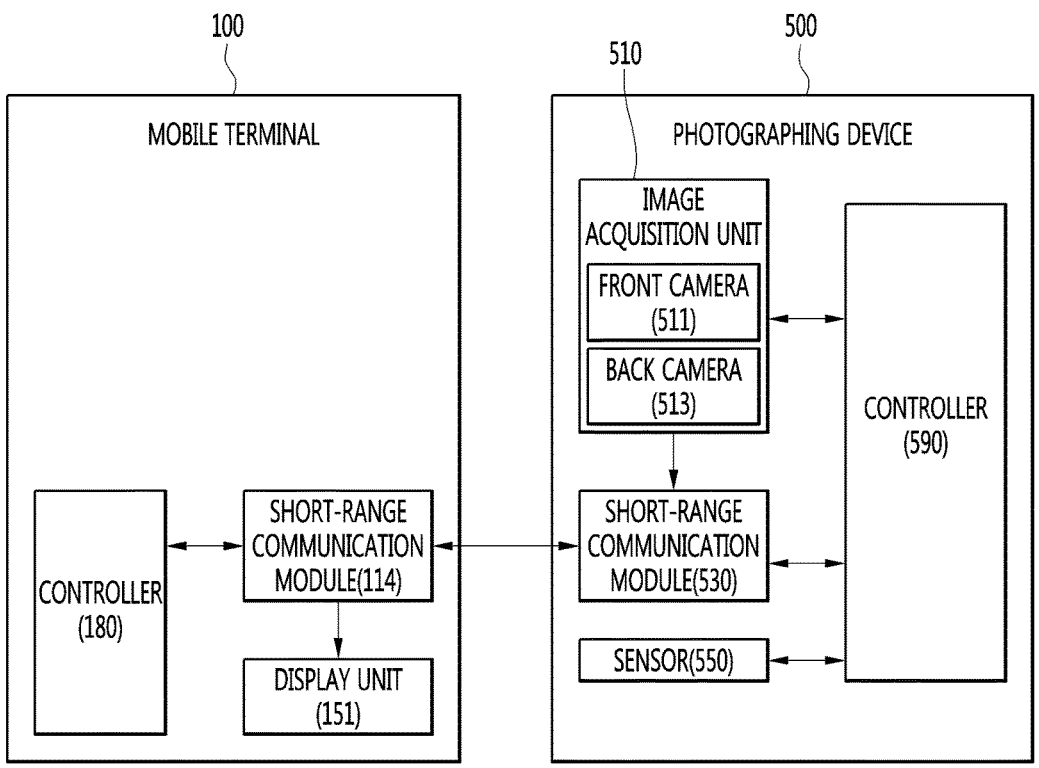
FIG. 5 is a diagram illustrating configurations of a mobile terminal and a photographing device according to an embodiment of the present disclosure.

FIG. 5 is a diagram illustrating configurations of a mobile terminal and a photographing device according to an embodiment of the present disclosure.

In FIG. 5, some of the elements of the mobile terminal 100 illustrated in FIG. 1A are illustrated. The description given with reference to FIG. 1A is referred to with respect to a configuration of the mobile terminal 100 illustrated in FIG. 5.

The photographing device 500 may include an image acquisition unit 510, a short-range communication module 530, a sensor 550, and a controller 590.

The image acquisition unit 510 may acquire an omnidirectional image by photographing an omnidirectional background around the photographing device 500. The omnidirectional image may have a sphere shape. The omnidirectional image may be referred to as a 360-degree image.

The image acquisition unit 510 may include a plurality of cameras. Although a front camera 511 and a back camera 513 are given as examples in FIG. 5, the cameras are not limited thereto and three or more cameras may be provided in the photographing device 500.

Each of the front camera 511 and the back camera 513 may have a fisheye lens having of an angle of view of 180 degrees or more. Each of the front camera 511 and the back camera 513 may photograph an omnidirectional background through the fisheye lens.

The controller 590 may generate an omnidirectional image by combining two omnidirectional partial images respectively acquired through the fisheye lenses to have a sphere shape.

The short-range communication module 530 may transmit the sphere shaped omnidirectional image generated by the controller 590 to the mobile terminal 100 in a wireless manner. The short-range communication module 530 may transmit the omnidirectional image to the mobile terminal 100 according to any one of communication standards including WiFi Direct, Bluetooth, WiFi, and the like, which are only examples.

The photographing device 500 may include a wired communication interface, such as USB interface, in addition to the short-range communication module 530 and perform communication with the mobile terminal 100 through the wired communication interface.

The sensor 550 may include one or more of a gyro sensor and an acceleration sensor.

The controller 590 may control an entire operation of the photographing device 500.

Also, the photographing device 500 may include one or more microphones.

Figure 6:
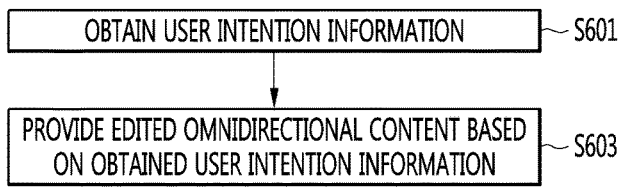
FIG. 6 is a flowchart of a method of operating a mobile terminal according to an embodiment of the present disclosure.

FIG. 6 is a flowchart of a method of operating a mobile terminal according to an embodiment of the present disclosure.

The controller 180 of the mobile terminal 100 obtains information about an intention to use omnidirectional content (S601) (may be referred to as use intention information). The omnidirectional content may be one of an omnidirectional moving image and an omnidirectional image.

The omnidirectional content may be content received from the photographing device 500 described with reference to FIG. 5, but is not limited thereto. The omnidirectional content may be content provided from a content provider.

The omnidirectional content may be content stored in the memory 170 of the mobile terminal 100.

According to an embodiment, the use intention information may be information indicating for which purpose the user uses the omnidirectional content.

In an embodiment, the controller 180 may obtain the use intention information through a request for sharing the omnidirectional content with a counterpart.

In another embodiment, the controller 180 may obtain the use intention information through a request for setting the omnidirectional content as a profile picture.

In another embodiment, the controller 180 may obtain the use intention information through a request for setting the omnidirectional content as a background screen picture.

In another embodiment, the controller 180 may obtain the use intention information through a request for setting the omnidirectional content as a lock screen picture.

In another embodiment, the controller 180 may obtain the use intention information through input text.

The controller 180 provides edited omnidirectional content based on the obtained use intention information (S603).

According to an embodiment, the controller 180 may extract a specific partial image of the omnidirectional content by using the obtained use intention information. The extracted partial image may be displayed on the display unit 151. The specific partial image of the omnidirectional content may be a partial image to which the use intention information is reflected.

In an embodiment, if the use intention information is obtained through the request for sharing the omnidirectional content with a counterpart, the controller 180 may identify the partial image which the user wants to view, from among the omnidirectional content. A partial image which the user is viewing may be an image which has been displayed on the display unit 151 before the request for sharing (or transmitting) the omnidirectional content is issued.

The controller 180 may transmit the omnidirectional content including information for identifying a partial region corresponding to the partial image of the omnidirectional content. The mobile terminal of the counterpart may receive the omnidirectional content and display the partial image of the received omnidirectional content.

In another embodiment, if the use intention information is obtained through a request for setting the omnidirectional content as a profile picture, the controller 180 may extract one or more persons included in the omnidirectional content and display face thumbnails of the one or more extracted persons.

In another embodiment, if the use intention information is obtained through a request for setting the omnidirectional content as a background screen picture, the controller 180 may display a partial image which the user has viewed most frequently, from among the omnidirectional content.

In another embodiment, if the use intention information is obtained through a request for setting the omnidirectional content as a lock screen picture, the controller 180 may display a partial image which the user has viewed most frequently, from among the omnidirectional content.

In another embodiment, if the use intention information is obtained through input text, the controller 180 may display a partial image including an object corresponding to the text in the omnidirectional content.

Examples of providing omnidirectional content in various types according to the use intention information will be described below.

Also, steps S601 and S603 illustrated in FIG. 6 will be described specifically according to types of the use intention information.

Figure 7:
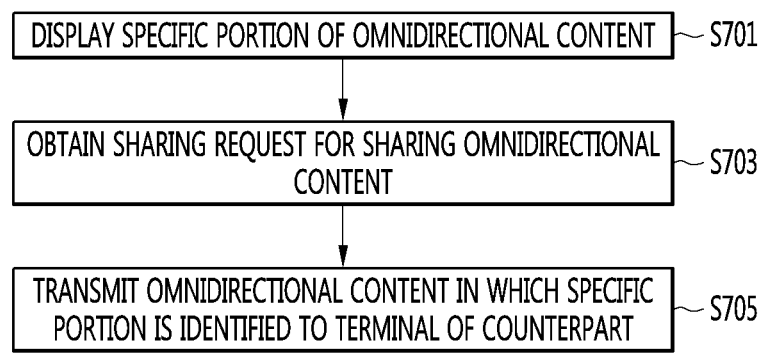
FIGS. 7 to 9 are diagrams for describing an example of transmitting omnidirectional content in a state in which a specific portion is identified if the use intention information is obtained through the request for sharing the omnidirectional content with a terminal of a counterpart according to an embodiment of the present disclosure.
Figure 8:
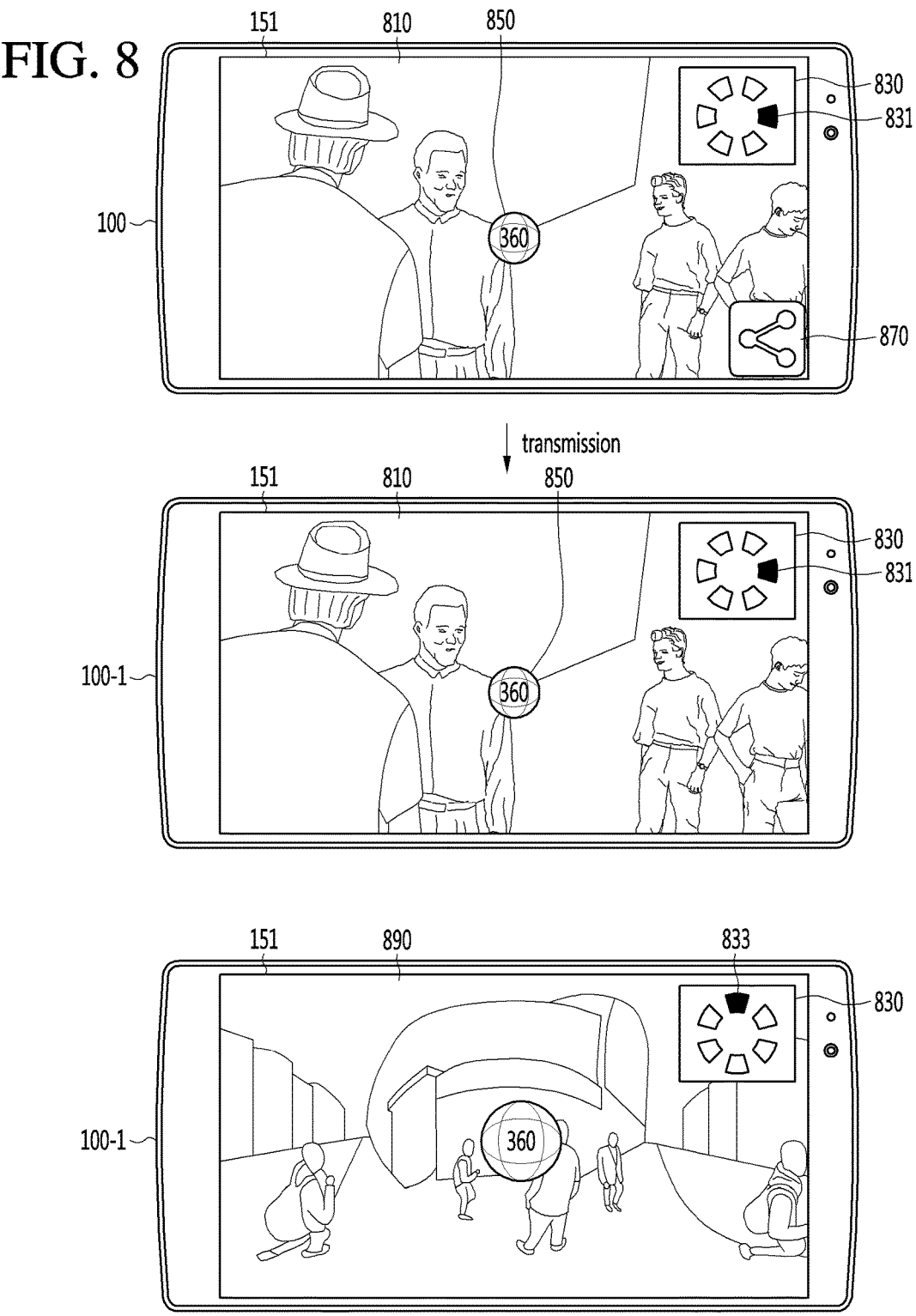
Figure 9:
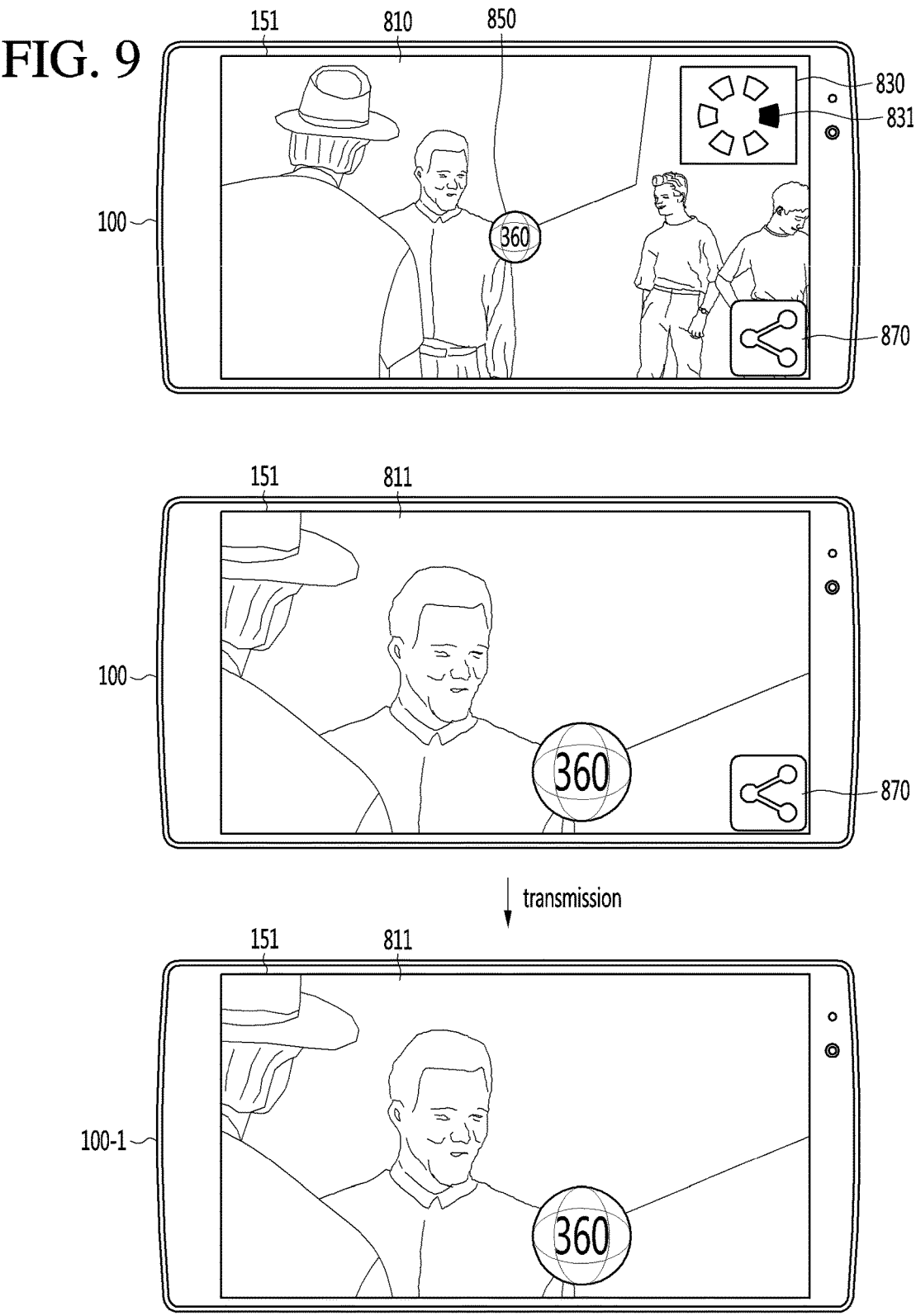

FIGS. 7 to 9 are diagrams for describing an example of transmitting omnidirectional content in a state in which a specific portion is identified if the use intention information is obtained through a request for sharing the omnidirectional content with a terminal of a counterpart according to an embodiment of the present disclosure.

Referring to FIG. 7, the controller 180 displays a specific portion of the omnidirectional content through the display unit 151 (S701).

The controller 180 obtains a sharing request for sharing the omnidirectional content, which is being displayed, with a terminal of a counterpart (S703).

The controller 180 transmits the omnidirectional content in which the specific portion is identified to the terminal of the counterpart through the wireless communication unit 110, in response to the obtained sharing request.

Steps S701 to S705 will be described in detail below with reference to FIGS. 8 and 9.

Referring to FIG. 8, the display unit 151 of the mobile terminal 100 is displaying a partial image 810 of an omnidirectional image. The display unit 151 may further display a region identification indicator 830 indicating which portion of the omnidirectional image the partial image 810 displays. The region identification indicator 830 may include a plurality of region identification indicators corresponding to a plurality of areas obtained by dividing the sphere-shaped omnidirectional image. The region identification indicator 831 corresponding to the partial image 810 displayed on the display unit 151 from among the plurality of region identification indicators may be highlighted.

The display unit 151 may further display an omnidirectional identifier icon 850 indicating that an image currently displayed on the display unit 151 is the omnidirectional image (or 360-degree image). The omnidirectional identifier icon 850 is displayed for a predetermined period of time and may then disappear.

The display unit 151 may further display a sharing icon 870 for sharing the currently-displayed omnidirectional image with a mobile terminal 100-1 of a counterpart.

If the sharing icon 870 is selected, the controller 180 may display a list of counterpart devices representing subjects to be shared. If one mobile terminal 100-1 is selected from the list of counterpart devices, the controller 180 may transmit an omnidirectional image to the mobile terminal 100-1 of the counterpart through the wireless communication unit 110.

If the sharing icon 870 is selected, the controller 180 may obtain an intention to share the omnidirectional image with the terminal of the counterpart in a state in which a partial image 810 is identified.

The controller 180 may identify the partial image 810 displayed through the display unit 151 before the omnidirectional image is transmitted to the mobile terminal 100-1 of the counterpart. The controller 180 may identify the partial image 810 displayed through the display unit 151 at a time point if the sharing icon 870 is selected.

In another embodiment, the controller 180 may capture the partial image 810 displayed through the display unit 151 and transmit the captured image with the omnidirectional image, at a time point if the sharing icon 870 is selected.

The controller 180 may transmit the omnidirectional image including identification information for identifying the partial image 810 to the mobile terminal 100-1 of the counterpart. The identification information for identifying the partial image 810 may include one or more of the captured image and an angle range corresponding to the partial image 810. The mobile terminal 100-1 of the counterpart may include all configurations of the mobile terminal 100 illustrated in FIG. 1A.

The mobile terminal 100-1 of the counterpart may receive the omnidirectional image, in which the partial image 810 is identified, from the mobile terminal 100. The mobile terminal 100-1 of the counterpart may immediately display the identified partial image 810 of the omnidirectional image on the display unit 151, based on the information for identifying the partial image 810.

Formerly, if receiving an omnidirectional image, the mobile terminal 100-1 of the counterpart displays a partial image corresponding to an angle range set by default. However, according to an embodiment of the present disclosure, the mobile terminal 100-1 of the counterpart may display the partial image 810, which the user has viewed, as it is. Therefore, the counterpart does not need to separately make an input for searching for a portion which the user has viewed.

On the other hand, the mobile terminal 100-1 of the counterpart may change the partial image 810 to another partial image 890 corresponding to another angle range according to a pinch-out or pinch-in command. Accordingly, a region identification indicator 833 corresponding to the another partial image 890 included in the region indicator 830 may be highlighted.

Details will be described with reference to FIG. 9.

Referring to FIG. 9, the display unit 151 of the mobile terminal 100 is displaying a partial image 810 of an omnidirectional image. The display unit 151 may further display a sharing icon 870.

The controller 180 may receive an enlargement command for enlarging the partial image 810. The controller 180 may display the enlarged partial image 811 according to the received enlargement command.

If the sharing icon 870 is selected, the controller 180 may identify the enlarged partial image 811. If the sharing icon 870 is selected, the controller 180 may transmit the omnidirectional image including identification information for identifying the partial image 811 to the mobile terminal 100-1 of the counterpart. The information for identifying the enlarged partial image 810 may include one or more of an image obtained by capturing the enlarged partial image 811 or an angle range corresponding to the enlarged partial image 811.

The mobile terminal 100-1 of the counterpart may receive the omnidirectional image, in which the enlarged partial image 811 is identified, from the mobile terminal 100. The mobile terminal 100-1 of the counterpart may immediately display the enlarged partial image 811 through the display unit 151, based on the information for identifying the enlarged partial image 811.

Therefore, the user can immediately view the partial image which the user has viewed or interested without separate searching.

Figure 10:
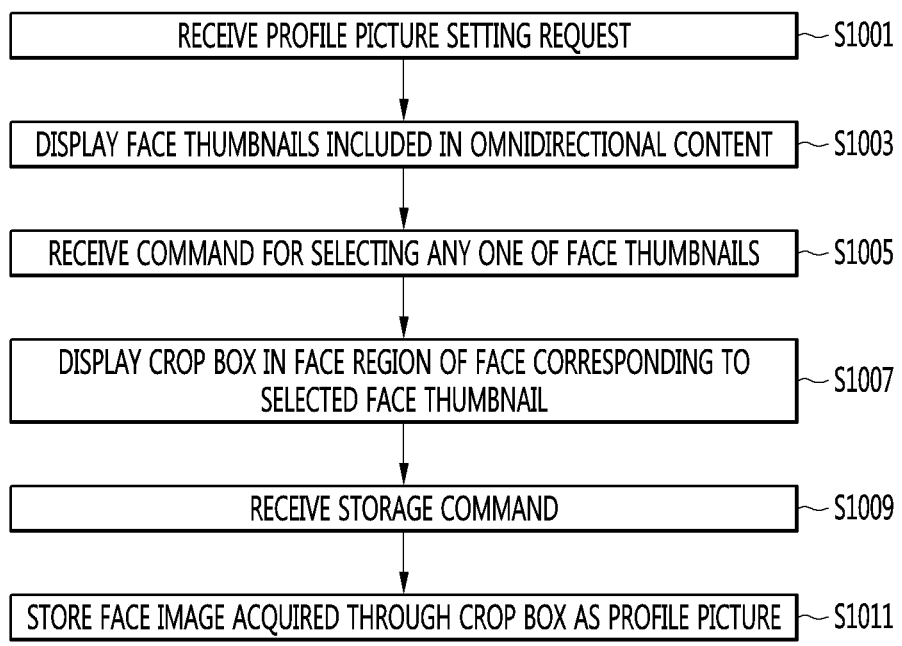
Figure 12:
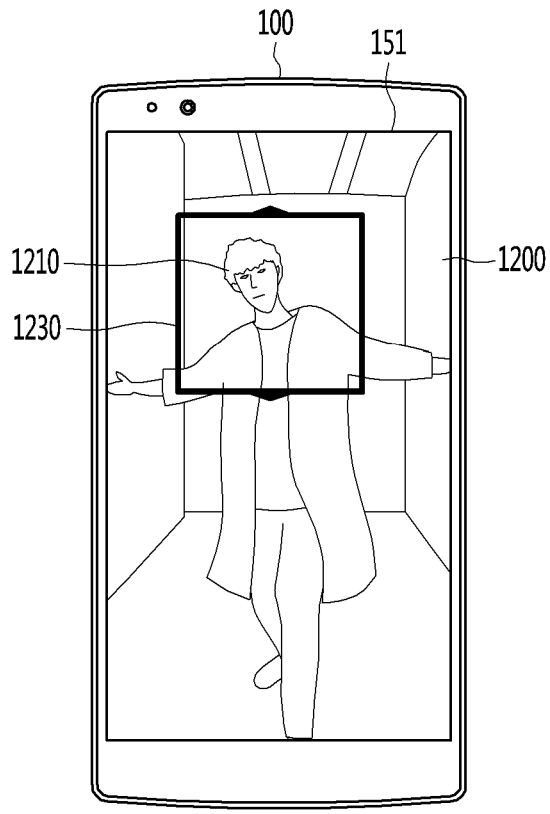

FIGS. 10 to 12 are diagrams for describing an example of providing edited omnidirectional content if the use intention information is obtained through the request for setting the omnidirectional content as a profile picture according to an embodiment of the present disclosure.

Referring to FIG. 10, the controller 180 receives a profile picture setting request (S1001).

According to an embodiment, the profile picture may be a picture for identifying a user in a call application or a social network service application. Although a picture is taken as an example herein, the embodiments are not limited thereto, and it is possible to set a moving image having a predetermined playback time period. In this case, the omnidirectional content may be an omnidirectional moving image.

The controller 180 may display face thumbnails included in the omnidirectional content, in response to the profile picture setting request (S1003).

According to an embodiment, before reception of the profile picture setting request, the controller 180 may display the omnidirectional content. In this case, the controller 180 may extract the face thumbnails from persons included in the displayed omnidirectional content.

According to another embodiment, before reception of the profile picture setting request, the controller 180 may not display the omnidirectional content. In this case, the controller 180 may display a list of omnidirectional content and extract the face thumbnails from the omnidirectional content selected from the list of omnidirectional content, in response to the profile picture setting request.

The controller 180 may receive a command for selecting any one of the face thumbnails (S1005) and display a crop box on a face of a person corresponding to a selected face thumbnail in response to the received command (S1007).

The controller 180 may receive a storage command for storing a face image of a person corresponding to the crop box as a profile picture (S1009) and store the face image acquired through the crop box as the profile picture in response to the received storage command.

Steps S1001 to S1011 will be described in detail below with reference to FIG. 11.

Referring to FIG. 11, the display unit 151 of the mobile terminal 100 is displaying a partial image 810 of an omnidirectional image.

The display unit 151 may further display a profile icon 1110 for setting a profile picture.

If the profile icon 1110 is selected, the controller 180 may obtain an intention to set the profile picture. If the profile icon 1110 is selected, the controller 180 may grasp that a request for setting the profile picture is received.

If the profile icon 1110 is selected, the controller 180 may extract faces of persons included in the omnidirectional image. The controller 180 may display a plurality of face thumbnails 1131, 1133, and 1135 corresponding to the extracted faces through the display unit 151.

If a command for selecting a first face thumbnail 1131 is selected, the controller 180 may display a crop box 1150 on a face region of a person corresponding to the selected first face thumbnail 1131. Also, if a command for selecting a first face thumbnail 1131 is selected, the controller 180 may display the face region of the person corresponding to the first face thumbnail 1131 and the crop box 1150 on a screen center of the display unit 151.

The crop box 1150 may be a box for adjusting a size of a face image set as the profile picture.

When the size is adjusted through the crop box 1150 and a storage command for storing the set face image is received, the controller 180 may store the face image which is cut through the crop box 1150 as the profile picture.

According to the embodiments of FIGS. 10 and 11, it is possible to obtain the user intention to set the profile picture and provide the face thumbnails of the persons distributed in omnidirectional directions. Therefore, the user may set the profile picture rapidly without inconvenience for the user of needing to move the omnidirectional image separately.

Details will be described with reference to FIG. 12.

If the profile picture setting request is received, the controller 180 may display a partial image 1200 of an omnidirectional image through the display unit 151. The controller 180 may obtain a user intention to set a profile picture through the profile picture setting request. The controller 180 may extract a face region 1210 of a person included in the omnidirectional image based on the obtained user intention and display the partial image 1200 including the extracted image region 1210.

The controller 180 may display a crop box 1230 in which the face region 1210 is cut. Ween a storage command for storing the face region 1210 is received through the crop box 1230, the controller 180 may set a face image corresponding to the face region 1210 as a profile picture.

Figure 13:
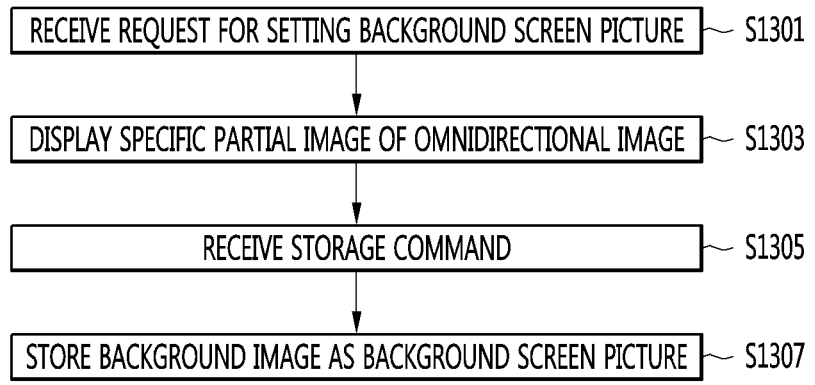
FIGS. 13 to 15 are diagrams for describing an example of providing edited omnidirectional content if the use intention information is obtained through the request for setting the omnidirectional content as a background screen picture according to an embodiment of the present disclosure.
Figure 14:
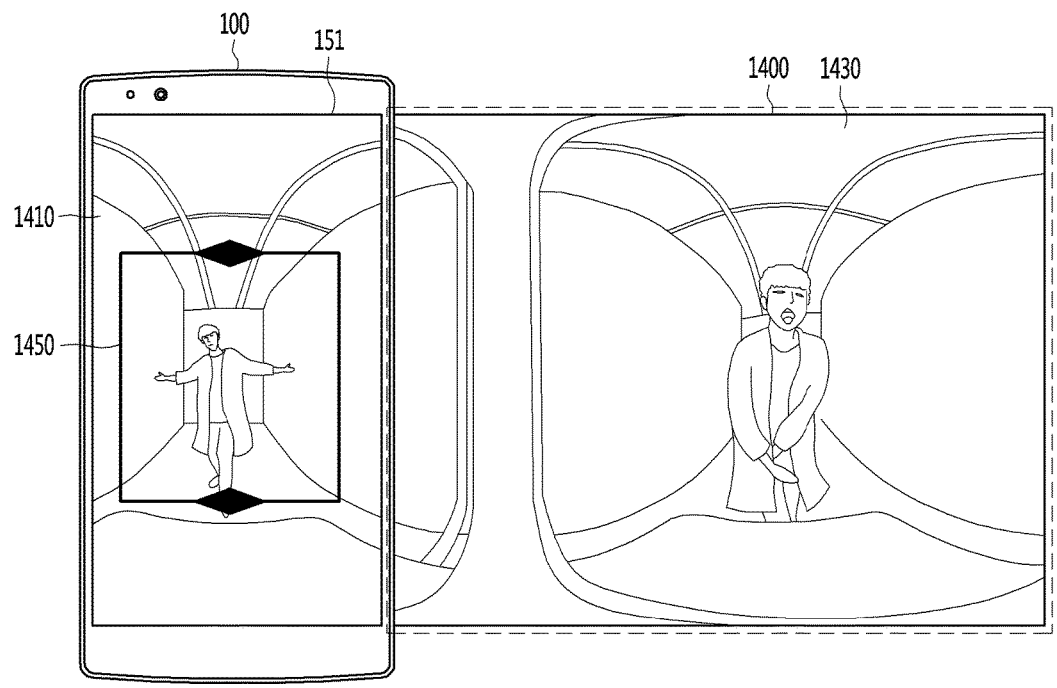
Figure 15:
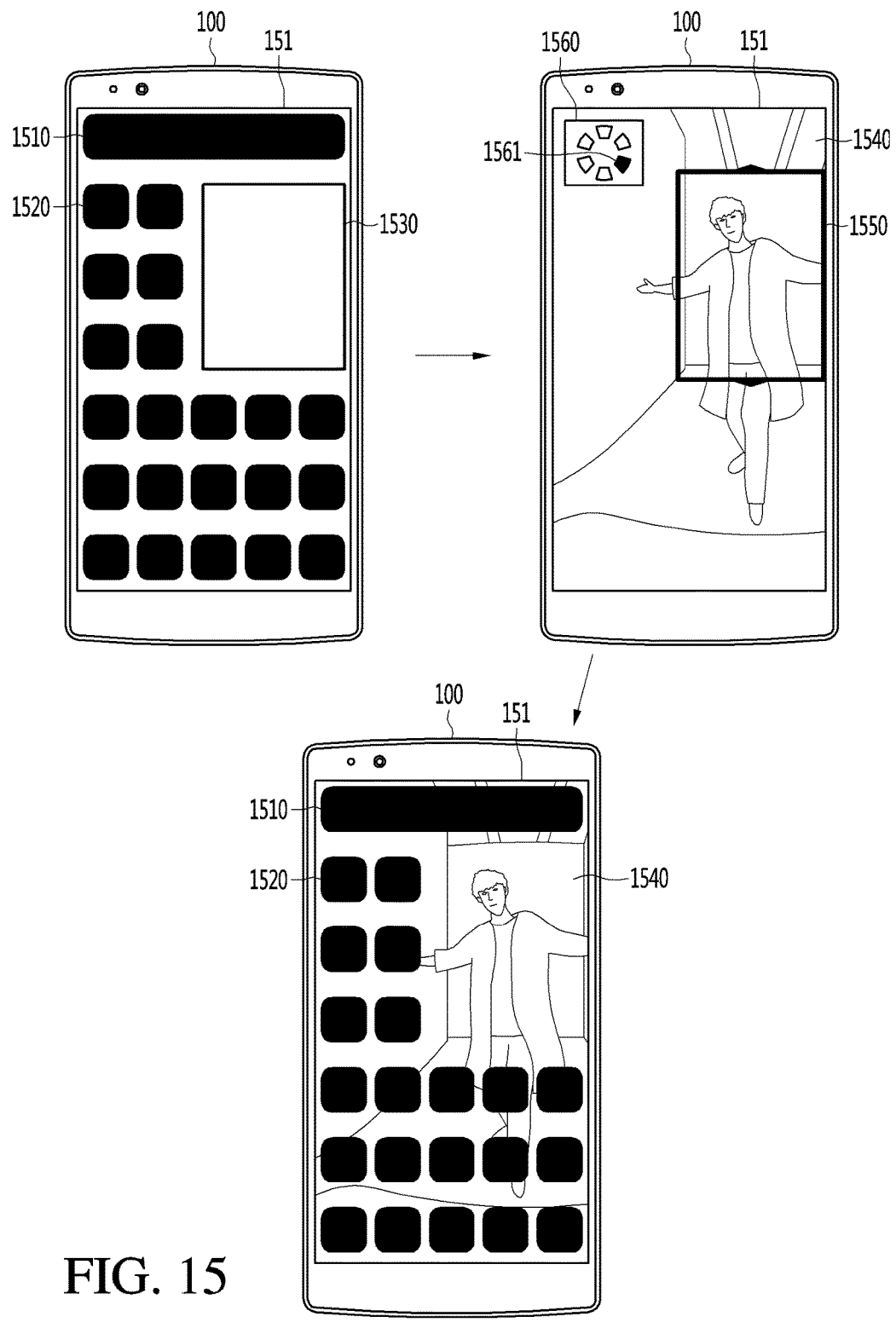

FIGS. 13 to 15 are diagrams for describing an example of providing edited omnidirectional content if the use intention information is obtained through the request for setting the omnidirectional content as a background screen picture according to an embodiment of the present disclosure.

Referring to FIG. 13, the controller 180 receives a request for setting a picture for a background screen (S1301).

The background screen may be a home screen of the mobile terminal 100. The controller 180 may obtain use intention information through a request for setting a background screen. Specifically, the controller 180 may obtain a user intention to set a picture for the background screen through the request for setting a picture for the background screen.

According to an embodiment, the request for setting a picture for the background screen may be a request for selecting a background image setting icon (not illustrated) displayed on the display unit 151.

The controller 180 displays a specific partial image image in the omnidirectional image (S1303). The controller 180 may obtain the use intention information to set a picture for the background screen through the request for setting the background screen. The controller 180 may extract a portion of the omnidirectional image, which the user has viewed most frequently or for the longest time, based on the obtained intention information.

The controller 180 receives a storage command for storing a background image corresponding to the specific partial image (S1305) and sets a background image as a background screen picture in response to the received storage command (S1307).

Steps S1301 to S1307 will be described in detail below with reference to FIGS. 14 and 15.

First, details will be described with reference to FIG. 14. In FIG. 14, it is assumed that an omnidirectional image 1400 includes a first partial image 1410 and a second partial image 1430.

The display unit 151 of the mobile terminal 100 may obtain use intention information through a request for setting a picture for a background screen and display the first partial image 1410 of the omnidirectional image 1400 through the display unit 151 based on the obtained intention information.

The first partial image 1410 may be an image corresponding to a portion of the omnidirectional image 1400 which the user has viewed most frequently. If the user has viewed the first partial image 1410 of the omnidirectional image 1400 most frequently, the controller 180 may display the first partial image 1410 through the display unit 151 in response to a request for setting a background screen picture.

As another example, the first partial image 1410 may be an image corresponding to a portion of the omnidirectional image 1400 which the user has viewed most frequently. The controller 180 may display the first partial image 1410 through the display unit 151 in response to the request for setting a picture for the background screen.

The controller 180 may display a crop box 1450 for setting a portion or whole of the first partial image 1410 as an image for the background screen through the display unit 151. The user may adjust a size of the image for the background screen through the crop box 1450.

The controller 180 may set a background image acquired through the crop box 1450 as a picture for the background screen in response to the storage command.

Details will be described with reference to FIG. 15.

A plurality of items, such as a widget 1510 and a plurality of application icons 1520, may be displayed on the background screen displayed through the display unit 151 of the mobile terminal 100. Due to the above items, the background image is hidden from view. The background screen may include an empty region 1530 in which no item is displayed.

The controller 180 may identify the empty region 1530 and arrange a central region of the specific partial image of the omnidirectional image on the identified empty region 1530.

The controller 180 may grasp that the user intention is to set a picture for the background screen of the mobile terminal 100 through the background screen setting request. The controller 180 may display the specific partial image 1540 of the omnidirectional image which the user has viewed most frequently through the display unit 151 based on the grasped user intention.

The controller 180 may further display a region identification indicator 1561 included in the region indicator 1560. The region identification indicator 1561 may identify at which position, the specific partial image 1540 of the omnidirectional image is located.

The controller 180 may locate the crop box 1550 at a position corresponding to the empty region 1530 of the background screen. At the same time, the controller 180 may locate a center of the specific partial image 1540 on the crop box 1550 corresponding to the empty region 1530.

The controller 180 may receive a storage command in a state in which the center of the specific partial image 1540 is located in the empty region 1530 and set the specific partial image 1540 as a background image in response to the received storage command. A portion of the specific partial image 1540 only may be set as a background image through the crop box 1550.

Figure 16:
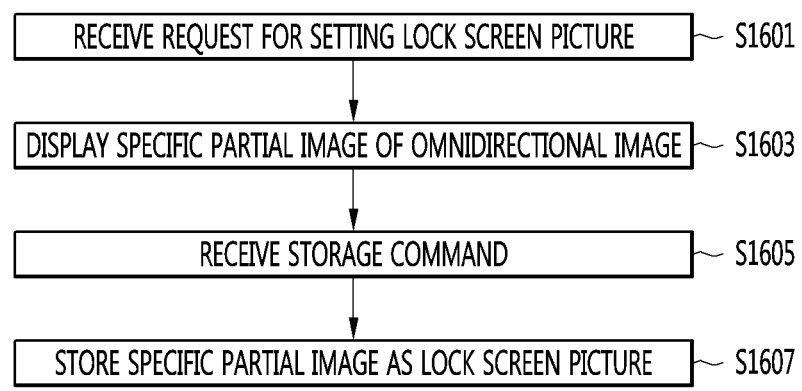
FIGS. 16 to 17 are diagrams for describing an example of providing edited omnidirectional content if the use intention information is obtained through the request for setting the omnidirectional content as a lock screen picture according to an embodiment of the present disclosure.
Figure 17:
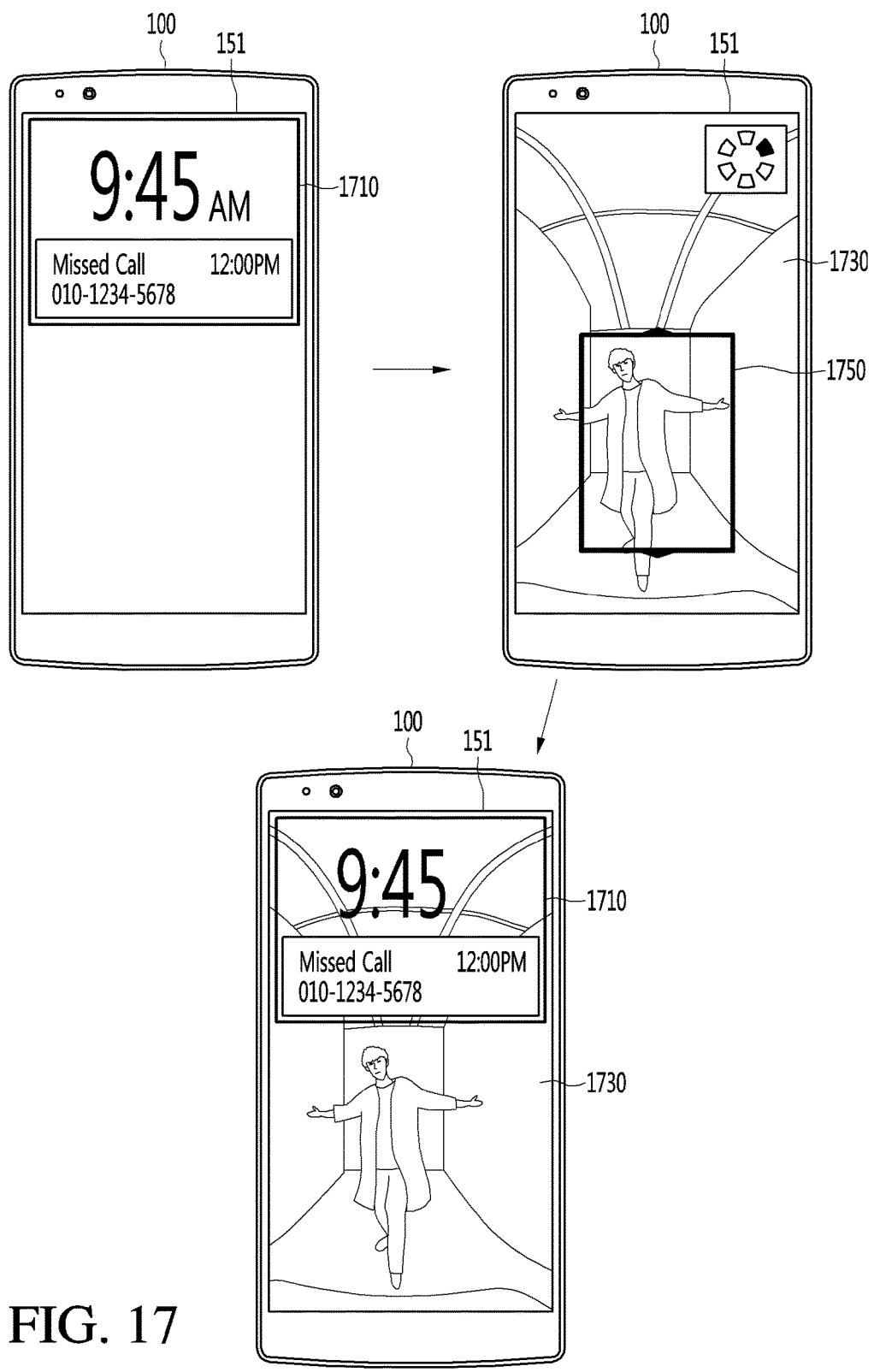

FIGS. 16 to 17 are diagrams for describing an example of providing edited omnidirectional content if the use intention information is acquired through the request for setting the omnidirectional content as a lock screen picture according to an embodiment of the present disclosure.

Referring to FIG. 16, the controller 180 receives a request for setting a picture for a lock screen (S1601).

The lock screen may be a screen displayed before a previously-set password or a lock pattern is input. If a previously-set password or a lock pattern is input, the lock screen may be switched to a home screen.

Referring to FIG. 17, the lock screen displayed through the display unit 151 may include a lock screen information region 1710. The lock screen information region 1710 may include time information, notification information, and the like.

The controller 180 may acquire use intention information through a request for setting a lock screen. Specifically, the controller 180 may acquire a user intention to set a picture for the lock screen through the request for setting a picture for the lock screen.

According to an embodiment, the request for setting a picture for the lock screen may be a request for selecting a lock screen image setting icon (not illustrated) displayed on the display unit 151.

Referring back to FIG. 16, details will be described.

The controller 180 displays an image of a partial region in the omnidirectional image (S1603). The controller 180 may acquire the use intention information to set a picture for the lock screen through the request for setting the lock screen. The controller 180 may extract a portion of the omnidirectional image, which the user has viewed most frequently or for the longest time during a predetermined period of time, based on the acquired intention information.

The controller 180 may display a specific partial image 1730 in consideration of the lock screen information region 1710. That is, as illustrated in FIG. 17, the controller 180 may display the specific partial image 1730 such that a center of the specific partial image 1730 is not hidden due to the lock screen information region 1710.

The controller 180 receives a storage command for storing a lock screen image corresponding to the specific partial image (S1605) and sets a lock screen image as a lock screen picture in response to the received storage command (S1607).

That is, the controller 180 may adjust the arrangement of the specific partial image 1730 so as to prevent the center of the specific partial image 1730 from being hidden due to the lock screen information region 1710. The center of the specific partial image 1730 may be identified through the crop box 1750 as illustrated in FIG. 17.

A portion of the specific partial image 1730 to be set as the lock screen image may be cut through the crop box 1750.

A portion or whole of the specific partial image 1730 may be set as an image for a lock screen through the crop box 1750.

Referring back to FIG. 18, details will be described.

FIG. 18 is a diagram for describing an example of providing edited omnidirectional content if use intention information is acquired through text according to an embodiment of the present disclosure.

Referring to FIG. 18, the display unit 151 of the mobile terminal 100 may display an execution window 1800 for a mobile message application. The mobile message application may be an application for sharing text, images, or moving images with a mobile terminal 100-1 of a counterpart.

The controller 180 of the mobile terminal 100 may identify a specific word 1810 of a sentence input through the mobile terminal 100-1 of the counterpart. The controller 180 of the mobile terminal 100 may transmit an omnidirectional image to the mobile terminal 100-1 of the counterpart. In this case, the controller 180 may extract an object corresponding to the specific word 1810 from the omnidirectional image and identify a partial image 1820 including the extracted object.

If the specific word 1810 is a "red car", the controller 180 may extract an object corresponding to the red car included in the omnidirectional image and identify the partial image 1820 including the extracted red car.

The controller 180 may transmit the omnidirectional image including information for identifying the partial image 1820 to the mobile terminal 100-1 of the counterpart.

After receiving the omnidirectional image, the mobile terminal 100-1 of the counterpart can reproduce the the omnidirectional image. In this case, the mobile terminal 100-1 of the counterpart may display the identified partial image 1820 through the display unit 151. Also, the mobile terminal 100-1 of the counterpart may highlight the object 1821 corresponding to the specific word 1810 in the partial image 1820.

The counterpart may immediately view a portion of the omnidirectional image, which is intended to be viewed by the counterpart herself or himself, without separate searching.

On the other hand, the mobile terminal 100-1 of the counterpart may switch the partial image 1820 to another partial image 1830 in the omnidirectional image according to a view switch command.

Figure 19A:
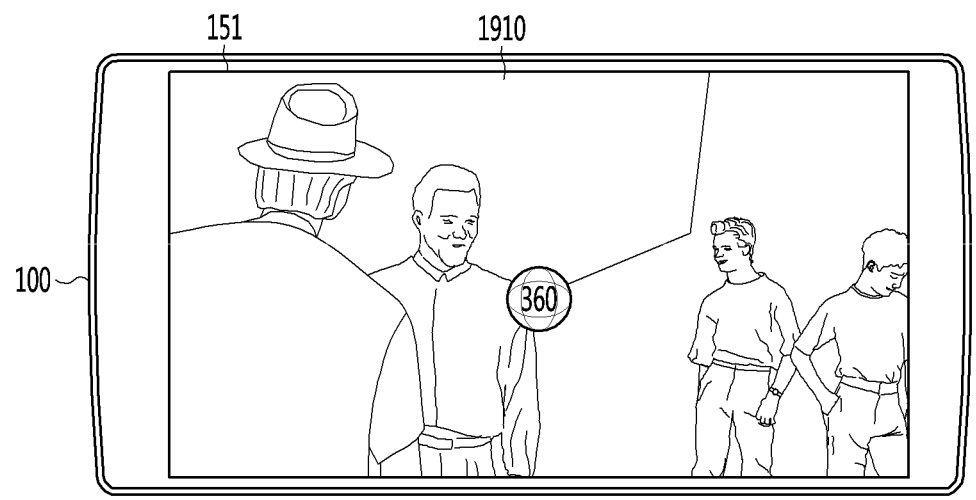
FIGS. 19A and 19B are diagrams for describing an example of providing edited omnidirectional content if use intention information is obtained through text according to another embodiment of the present disclosure.
Figure 19B:
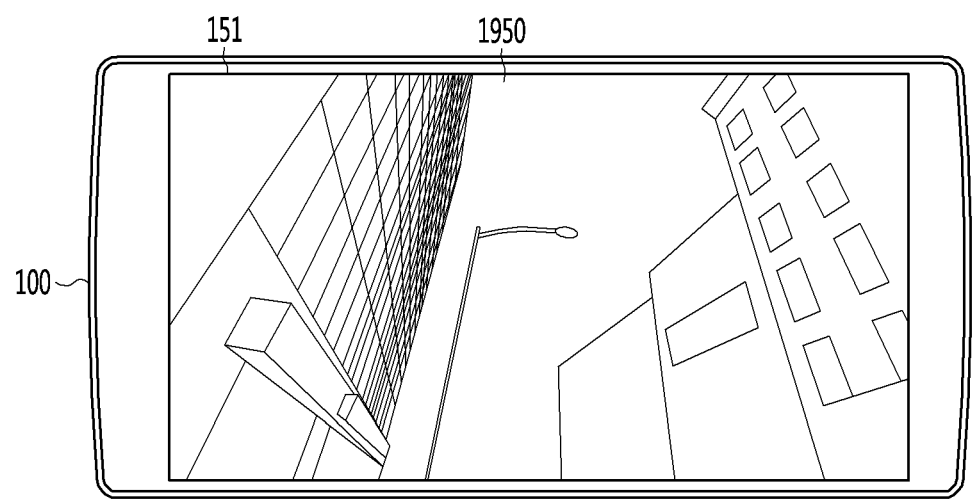

FIGS. 19A and 19B are diagrams for describing an example of providing edited omnidirectional content if use intention information is acquired through text according to another embodiment of the present disclosure.

In particular, FIGS. 19A and 19B are diagrams for describing an example in which an omnidirectional image is reproduced based on a hashtag if the omnidirectional image is uploaded through a social network service application.

Referring to FIG. 19A, the mobile terminal 100 may upload an omnidirectional image to a server for a social network service. The mobile terminal 100 may upload the omnidirectional image by using a first hashtag 1930 input by a user. If the omnidirectional image is reproduced, a partial image corresponding to the first hashtag 1930 may be reproduced. That is, the partial image 1910 including an object corresponding to text included in the first hashtag 1930 may be extracted from the omnidirectional image, and the omnidirectional image may be reproduced from the partial image 1910. That is, the partial image 1910 including an object that is a specific person may be first reproduced.

Referring to FIG. 19B, the mobile terminal 100 may upload an omnidirectional image to a server for a social network service. The mobile terminal 100 may upload the omnidirectional image by using a second hashtag 1970 input by the user. If the omnidirectional image is reproduced, a partial image corresponding to the second hashtag 1970 may be reproduced. That is, the partial image 1950 including an object corresponding to text included in the second hashtag 1970 may be extracted from the omnidirectional image, and the omnidirectional image may be reproduced from the partial image 1950. That is, the partial image 1950 including an object that is a specific landscape may be first reproduced.

Figure 20A:
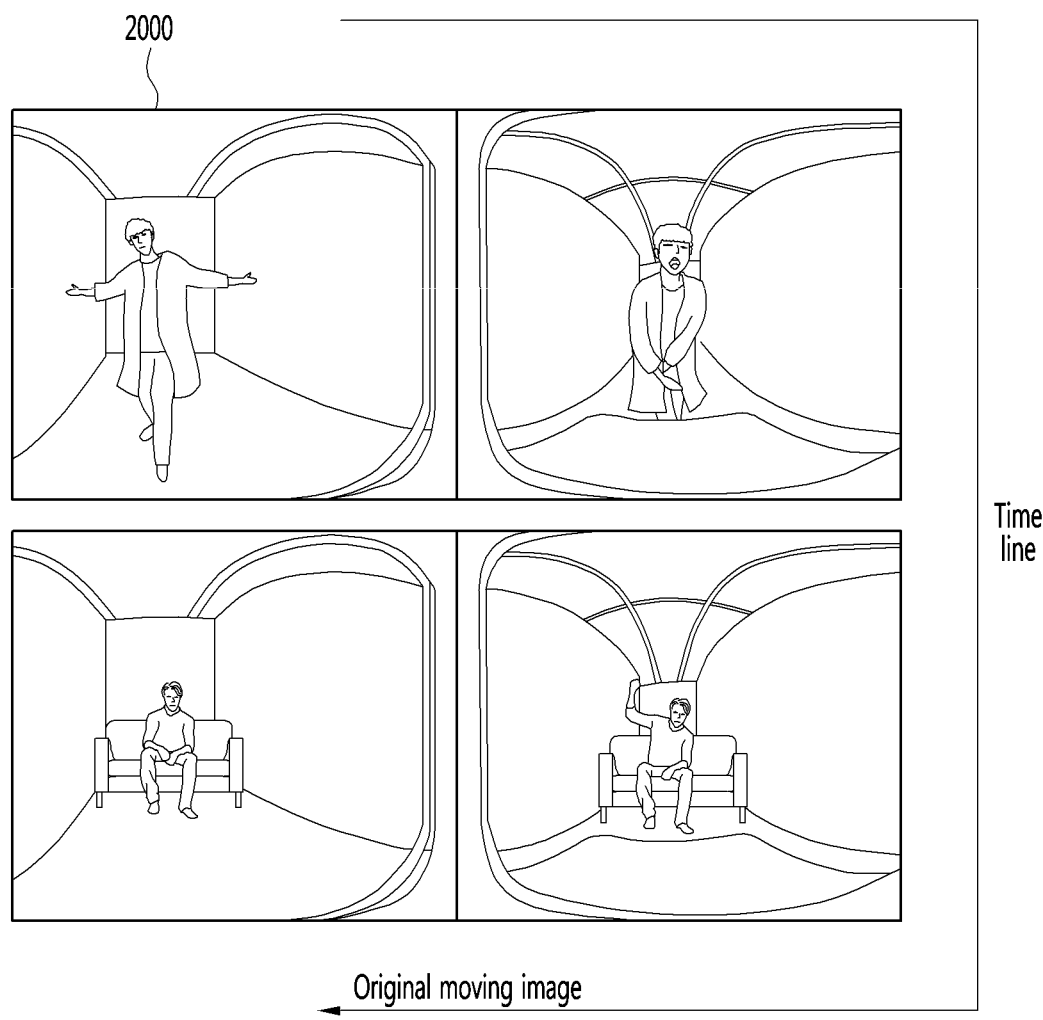
FIGS. 20A and 20B are diagrams for describing an example of providing edited omnidirectional content if use intention information is obtained through text or object selection according to an embodiment of the present disclosure.
Figure 20B:
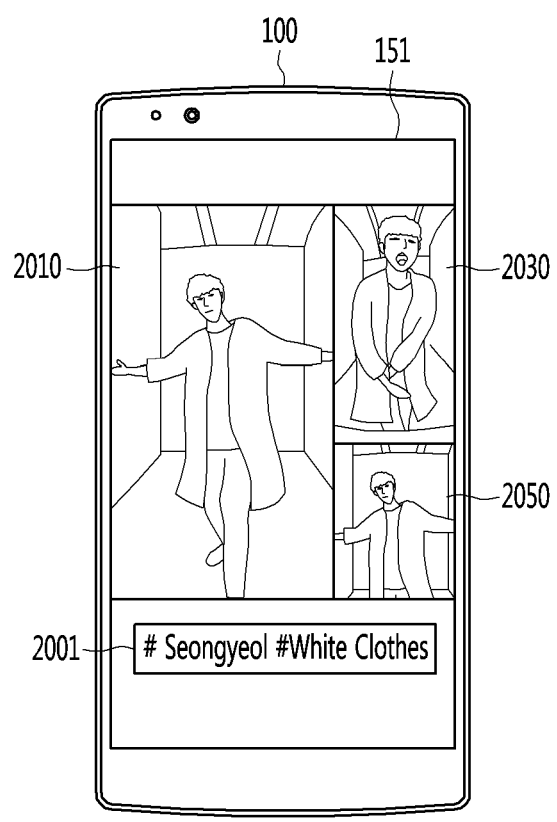

FIGS. 20A and 20B are diagrams for describing an example of providing edited omnidirectional content if use intention information is acquired through text or object selection according to an embodiment of the present disclosure.

FIG. 20A illustrates an omnidirectional moving image 2000 of an original image which is reproduced over time.

As illustrated in FIG. 20B, if a hashtag 2001 is input with respect to the omnidirectional moving image, the controller 180 may generate a collage of a plurality of omnidirectional images 2010, 2030, and 2050 included in the omnidirectional moving image 2000. That is, the controller 180 may extract omnidirectional images with respect to Seongyeol with a white cloth and display the extracted omnidirectional images as one image. The omnidirectional images may be images respectively including the front, side, back, and face of the corresponding person.

In another embodiment, if a specific object of the omnidirectional image included in the omnidirectional moving image is selected, the controller 180 may extract omnidirectional images including the selected specific object and display the extracted omnidirectional images as one image.

Figure 21A:
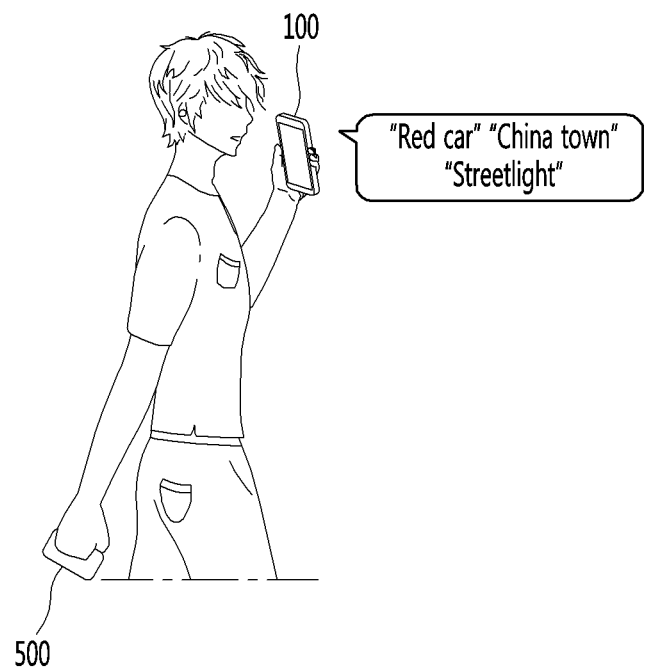
FIGS. 21A and 21B are diagram for describing an example of providing an edited omnidirectional image based on tagged voice if the omnidirectional image is photographed according to an embodiment of the present disclosure.
Figure 21B:
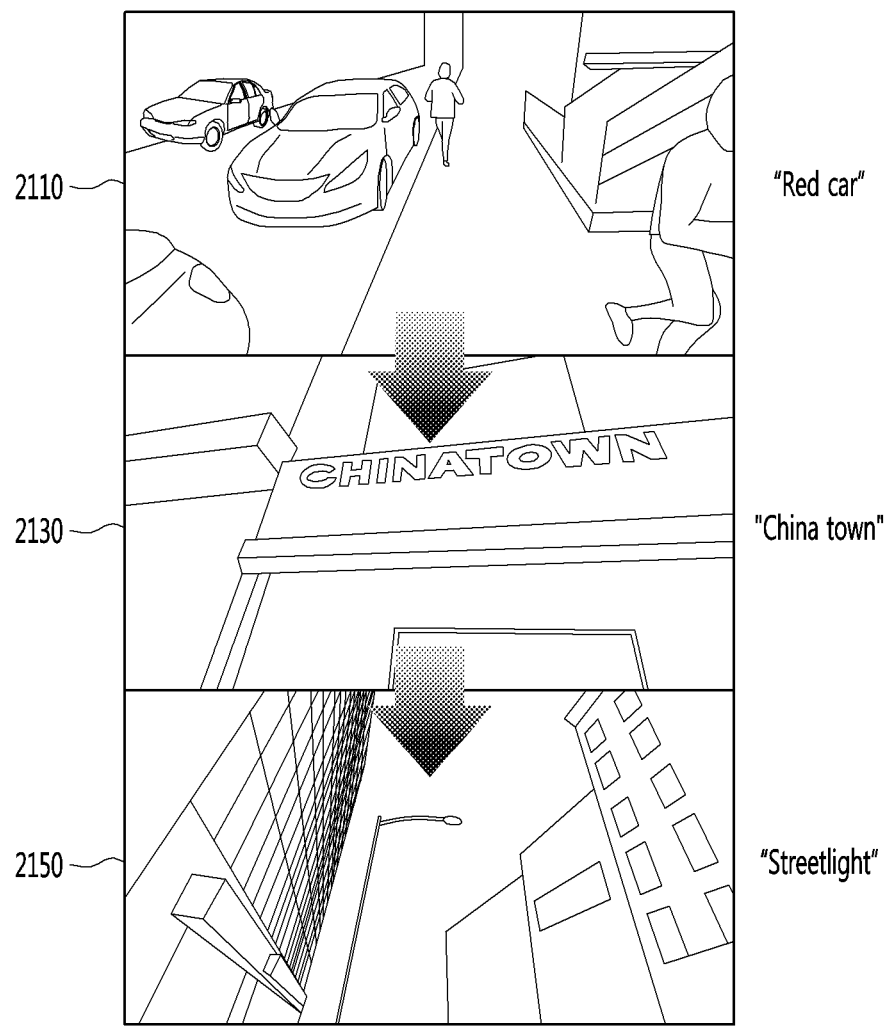

FIGS. 21A and 21B are diagrams for describing an example of providing an edited omnidirectional image based on tagged voice if the omnidirectional image is photographed according to an embodiment of the present disclosure.

FIG. 21A is a diagram for describing a situation in which a user utters a specific phonetic word while photographing an omnidirectional image by using a photographing device 500. The user may utter a phonetic word corresponding to an object intended to be tagged while looking at an omnidirectional background. The controller 180 of the mobile terminal 100 may store the phonetic word input through a microphone 122 in the memory 170 such that the phonetic word is mapped to the photographed omnidirectional image.

It is assumed that phonetic words are input in the order of a red car, a china town, and a streetlight. The controller 180 may grasp the phonetic words input sequentially as use intention information described with reference to FIG. 6.

The controller 180 may provide the photographed omnidirectional image based on a tagged phonetic word. Specifically, the controller 180 may sequentially reproduce a first partial image 2110 including an object corresponding to the red car, a second partial image 2130 including an object corresponding to the china town, and a third partial image 2150 including an object corresponding to the streetlight.

That is, the controller 180 may switch partial images of the omnidirectional image in the tagging order of the phonetic words.

The user may rapidly view a portion of the omnidirectional image, in which the user has an interest.

Figure 22A:
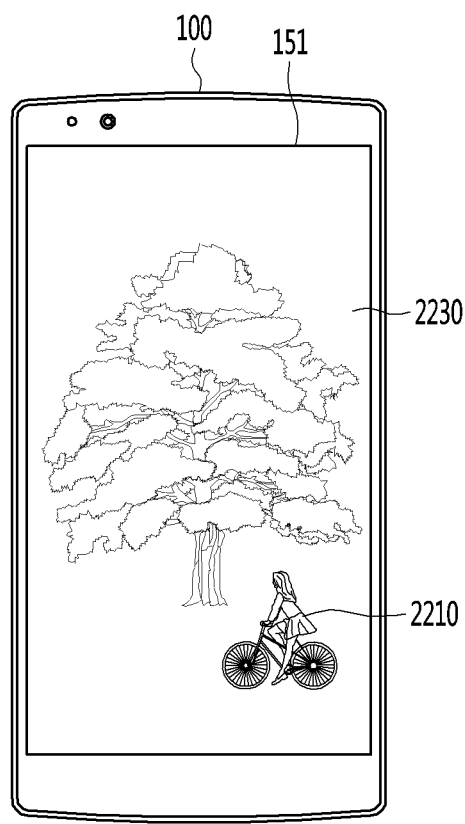
FIGS. 22A and 22B are diagrams for describing an example of providing edited omnidirectional content based on user intention according to another embodiment of the present disclosure.
Figure 22B:
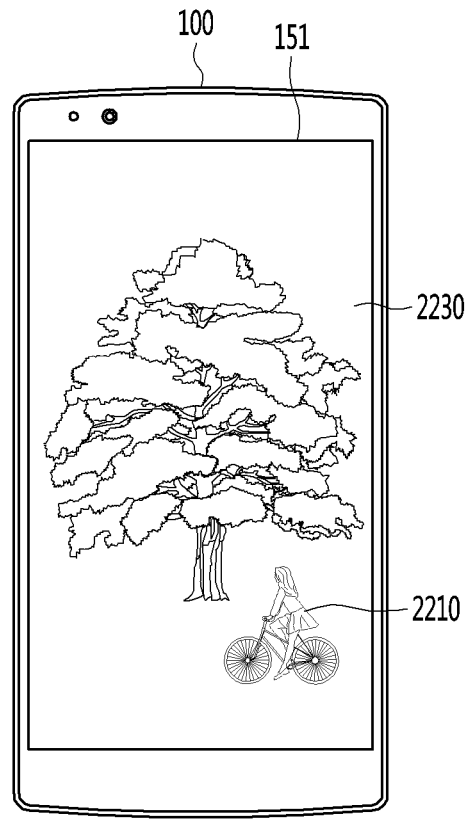

FIGS. 22A and 22B are diagrams for describing an example of providing edited omnidirectional content based on user intention according to another embodiment of the present disclosure.

Referring to FIG. 22A, the controller 180 receives a profile picture setting request. The controller 180 may acquire the user intention through the profile picture setting request. The controller 180 may display a person 2210 of an omnidirectional image clearly and a background 2330 of the omnidirectional image blurredly depending on the obtained user intention.

Referring to FIG. 22B, the controller 180 receives a background screen picture setting request. The controller 180 may obtain the user intention through the background screen picture setting request. The controller 180 may display a person 2210 of an omnidirectional image blurredly and a background 2230 of the omnidirectional image clearly depending on the obtained user intention.

FIGS. 23A and 23B are diagrams for describing an example of providing edited omnidirectional content based on user intention according to another embodiment of the present disclosure.

Referring to FIG. 23A, the controller 180 receives a profile picture setting request. The controller 180 may obtain the user intention through the profile picture setting request. The controller 180 may display an object 2310 of an omnidirectional image clearly and a background 2330 of the omnidirectional image blurredly according to the obtained user intention. Also, the controller 180 may display the crop box 2305 for identifying a region in which the object to be displayed clearly is included.

Referring to FIG. 23B, the controller 180 receives a background screen picture setting request. The controller 180 may obtain the user intention through the background screen picture setting request. The controller 180 may display the crop box 2340, which is larger compared to FIG. 23A, according to the obtained user intention. Also, the omnidirectional image 2350 included in the crop box 2340 may be clearly displayed.

That is, the position and size of the crop box 2305 may be changed according to the profile picture setting or the background screen setting.

Figure 24A:
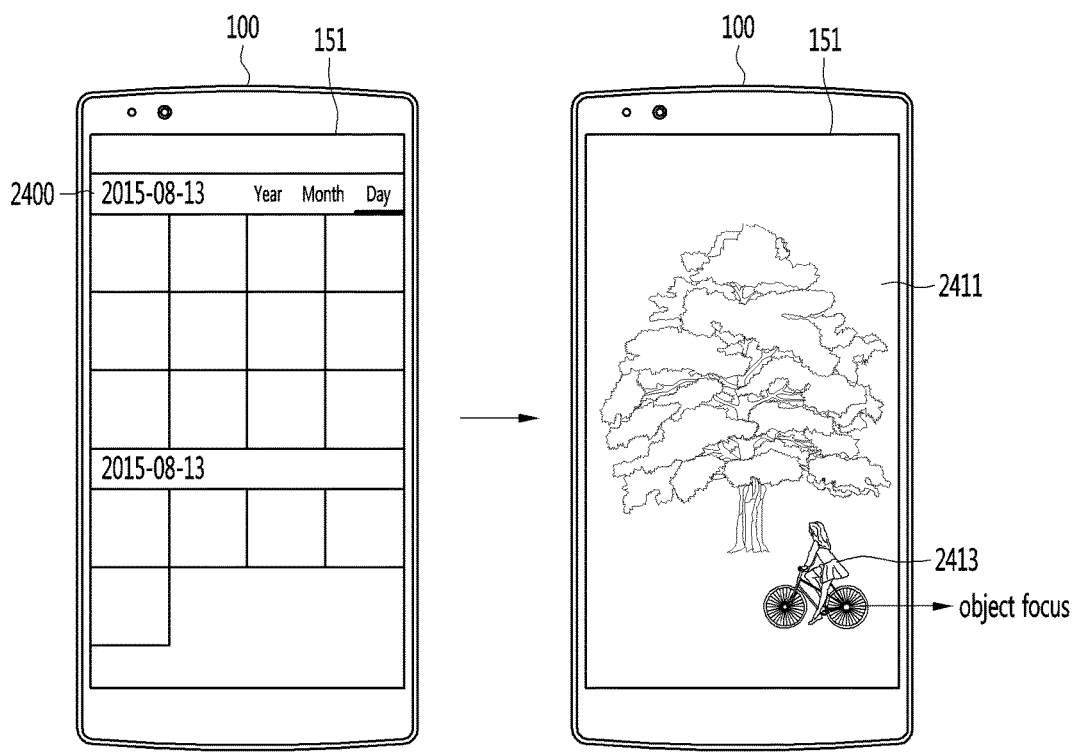
FIGS. 24A and 24B are diagrams for describing an example of providing edited omnidirectional content based on user intention through a search word according to another embodiment of the present disclosure.
Figure 24B:
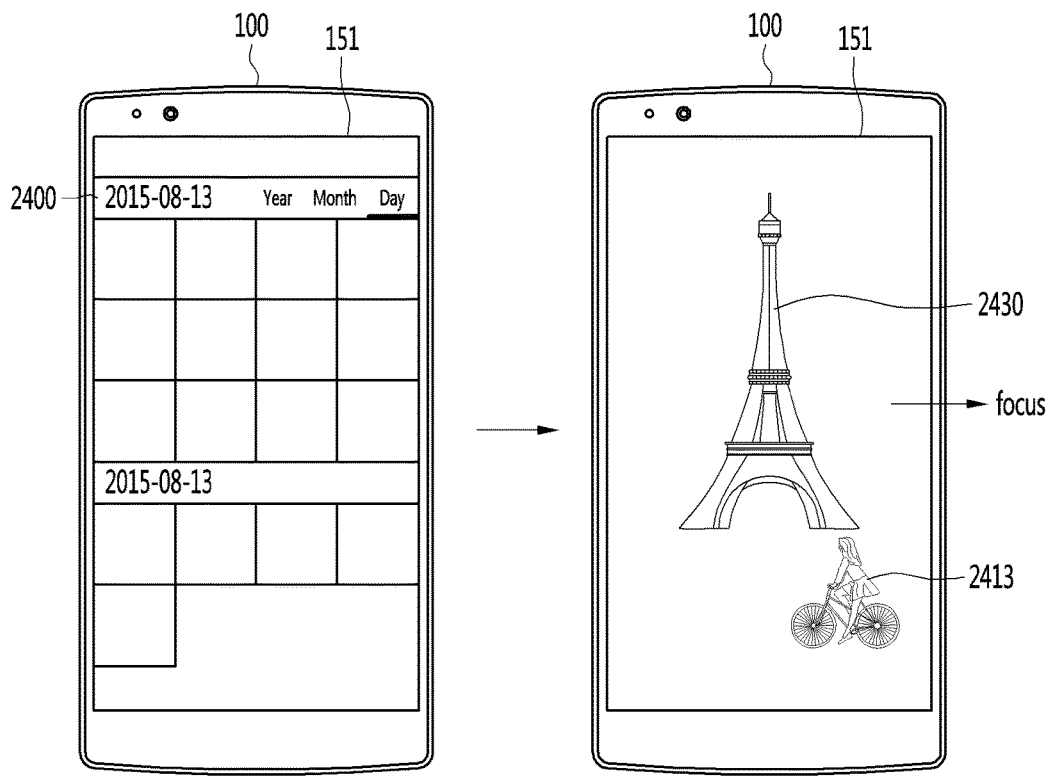

FIGS. 24A and 24B are diagrams for describing an example of providing edited omnidirectional content based on user intention through a search word according to another embodiment of the present disclosure.

Referring to FIG. 24A, the display unit 151 of the mobile terminal 100 may display an omnidirectional content list 2400. In this state, if a search word <one-piece dress> is input, the controller 180 may obtain the user intention to view a person wearing the one-piece dress. The controller 180 may display the omnidirectional image included in the omnidirectional content list 2400 and including the person wearing the one-piece dress according to the obtained user intention. Also, the controller 180 may clearly display the person wearing the one-piece dress 2413 on the displayed omnidirectional image and blurredly display the background 2411 other than the person.

On the other hand, if a search word <the Eiffel Tower> is input, the controller 180 may obtain the user intention to view the Eiffel Tower. The controller 180 may display the omnidirectional image included in the omnidirectional content list 2400 and including the Eiffel Tower according to the obtained user intention. Also, the controller 180 may clearly display the Eiffel Tower 2430 and the surroundings thereof on the displayed omnidirectional image and blurredly display the person 2413 other than the Eiffel Tower.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a display; and
   a controller configured to:
      cause the display to display an omnidirectional content;
      cause the display to display an icon for setting a profile picture of an application while the omnidirectional content is displayed;
      extract a plurality of faces of persons from the omnidirectional content in response to selection of the icon;
      cause the display to display a plurality of face thumbnails corresponding to the extracted plurality of faces; and
      set one of the plurality of face thumbnails as the profile picture of the application in response to selection of the one of the plurality of face thumbnails such that the set one of the plurality of face thumbnails is stored in a memory.

2. The mobile terminal of claim 1, wherein:
   the controller is further configured to cause the display to display an image corresponding to the one of the plurality of face thumbnails in response to the selection of the one of the plurality of face thumbnails; and the image corresponding to the one of the plurality of thumbnails is a portion of the omnidirectional content.

3. The mobile terminal of claim 2, wherein the controller is further configured to cause the display to display a crop box for editing a face region corresponding to the selected face thumbnail.

4. The mobile terminal of claim 1, wherein the controller is further configured to extract a most frequently viewed image as the partial image from the omnidirectional content when the use intention information is set according to a background screen picture setting request for setting a background screen picture on the display.

5. The mobile terminal of claim 4, wherein the controller is further configured to cause the display to display a center of the extracted partial image at an empty region included in a background screen of the display.

6. The mobile terminal of claim 1, wherein when the use intention information is set according to a request for setting a picture for a lock screen of the mobile terminal, the controller is further configured to:
   extract a most frequently viewed image as the partial image from the omnidirectional content; and
   cause the display to display a center of the extracted partial image at an empty region of the lock screen.

7. The mobile terminal of claim 1, wherein when the use intention information is set according to a request for sharing the omnidirectional content, the controller is further configured to:
   obtain identification information for identifying the partial image to be extracted and displayed; and
   cause transmission of the omnidirectional content, in which the obtained identification information is included, to another terminal.

8. The mobile terminal of claim 7, wherein the identification information includes:
   at least one image obtained by capturing the partial image; and
   angle information indicating a position at which the partial image is located in the omnidirectional content.

9. The mobile terminal of claim 1, further comprising a microphone configured to receive a phonetic word,
   wherein the controller is further configured to:
   recognize the phonetic word, which is received via the microphone while an omnidirectional image is photographed, as the use intention information; and
   extract an image including an object corresponding to the recognized phonetic word as the partial image from the omnidirectional content when the omnidirectional image is photographed.

10. The mobile terminal of claim 1, wherein the icon is displayed overlapping the displayed omnidirectional content.

11. The mobile terminal of claim 10, wherein the icon is not a portion of the omnidirectional content.

12. A method for operating a mobile terminal, the method comprising:
   displaying, on a display, an omnidirectional content and an icon for setting a profile picture of an application;
   extracting a plurality of faces of persons from the omnidirectional content in response to selection of the icon;
   displaying a plurality of face thumbnails corresponding to the extracted plurality of faces; and
   setting one of the plurality of face thumbnails as the profile picture of the application in response to selection of the one of the plurality of face thumbnails such that the set one of the plurality of face thumbnails is stored in a memory.

13. The method of claim 12, further comprising displaying an image corresponding to the one of the plurality of face thumbnails in response to the selection of the one of the plurality of face thumbnails,
   wherein the image corresponding to the one of the plurality of thumbnails is a portion of the omnidirectional content.

14. The method of claim 13, further comprising displaying a crop box for editing a face region corresponding to the selected face thumbnail.

15. The method of claim 12, wherein the extracting of the partial image comprises extracting a most frequently viewed image as the partial image from the omnidirectional content when the use intention information is set according to a background screen picture setting request for setting a background screen picture on a display.

16. The method of claim 15, wherein the displaying of the extracted partial image comprises displaying a center of the extracted partial image at an empty region included in a background screen of the display.

17. The method of claim 12, wherein when the use intention information is set according to a request for setting a picture for a lock screen of the mobile terminal:
   the extracting of the partial image comprises extracting a most frequently viewed image as the partial image from the omnidirectional content; and
   the displaying of the extracted partial image comprises displaying a center of the extracted partial image at an empty region of the lock screen.

18. The method of claim 12, wherein when the use intention information is set according to a request for sharing the omnidirectional content, the method further comprises:
   obtaining identification information for identifying the partial image to be extracted and displayed; and
   transmitting the omnidirectional content, in which the obtained identification information is included, to another terminal.

19. The method of claim 18, wherein the identification information includes:
   at least one image obtained by capturing the partial image; and
   angle information indicating a position at which the partial image is located in the omnidirectional content.

20. The method of claim 12, further comprising recognizing a phonetic word, which is received via a microphone while an omnidirectional image is photographed, as the use intention information,
   wherein the extracting of the partial image comprises extracting an image including an object corresponding to the recognized phonetic word as the partial image from the omnidirectional content when the omnidirectional image is photographed.

* * * * *